(12) United States Patent
Nagata

(10) Patent No.: US 8,149,429 B2
(45) Date of Patent: Apr. 3, 2012

(54) CONTROL APPARATUS, PROGRAM, COMPUTER-READABLE STORAGE MEDIUM, IMAGING APPARATUS CONTROL SYSTEM, AND CONTROL METHOD

(75) Inventor: Yoshinori Nagata, Kitakatsuragi-Gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 1029 days.

(21) Appl. No.: 12/082,276

(22) Filed: Apr. 9, 2008

(65) Prior Publication Data

US 2008/0252918 A1 Oct. 16, 2008

(30) Foreign Application Priority Data

Apr. 10, 2007 (JP) ................................. 2007-103318

(51) Int. Cl.
  *G06F 3/12* (2006.01)
  *G06K 15/00* (2006.01)
(52) U.S. Cl. ..................... 358/1.13; 358/1.15; 358/1.18; 358/1.2; 358/1.9
(58) Field of Classification Search .................. 358/1.13, 358/1.15, 1.18, 1.14, 1.1, 1.2, 1.6, 1.9, 400, 358/401, 403, 406, 407, 408, 474; 382/312, 382/317, 321; 399/75, 81, 82, 83, 84, 85, 399/86; 347/3, 5, 14, 23
See application file for complete search history.

(56) References Cited

U.S. PATENT DOCUMENTS

| 5,608,493 A | * | 3/1997 | Tanaka et al. ................... 399/83 |
| 2005/0024406 A1 | | 2/2005 | Otsuki |
| 2008/0198194 A1 | | 8/2008 | Otsuki |

FOREIGN PATENT DOCUMENTS

| JP | 03-231380 | 10/1991 |
| JP | 06-149952 | 5/1994 |
| JP | 10-151839 | 6/1998 |
| JP | 2003-198770 | 7/2003 |
| JP | 2004-216559 | 8/2004 |
| JP | 2005-324526 | 11/2005 |
| JP | 2006-031136 | 2/2006 |
| JP | 2006-247946 | 9/2006 |
| JP | 2006-259232 | 9/2006 |

* cited by examiner

*Primary Examiner* — Dov Popovici
(74) *Attorney, Agent, or Firm* — Edwards Wildman Palmer LLP; David G. Conlin; Edmund Koundakjian

(57) ABSTRACT

In acquiring setting information from a user, a multifunctional apparatus can be switched between (i) a first input mode in which an operation panel displays a setting window and accepts an operation from the user and (ii) a second input mode in which a printing section prepares an entry sheet on which setting information is written to be designated and a scanner section reads the entry sheet on which the setting information has been written. A control server controls such multifunctional apparatuses, and includes: an input mode selecting section for selecting either of the two input modes in accordance with a predetermined condition when the multifunctional apparatus acquires setting information from a user; and a command generating section for generating a control command for instructing the multifunctional apparatus to acquire setting information in the input mode selected by the input mode selecting section. This provides a user-friendly input environment.

18 Claims, 17 Drawing Sheets

FIG. 8

SELECT COPYING CONDITIONS

■PAPER SIZE (CHECK ONE)

|  | AUTO | A3 | A4 | A5 | B4 | B5 |
|---|---|---|---|---|---|---|
| CHECK | | | | | | |

■PAPER ORIENTATION (CHECK ONE)

|  | AUTO | PORTRAIT | LANDSCAPE |
|---|---|---|---|
| CHECK | | | |

■DENSITY (CHECK ONE)

|  | AUTO | DARK | ... | ... | ... | LIGHT |
|---|---|---|---|---|---|---|
| CHECK | | | | | | |

SELECT SCANNING CONDITIONS

■PAPER SIZE (CHECK ONE)

|  | AUTO | A3 | A4 | A5 | B4 | B5 |
|---|---|---|---|---|---|---|
| CHECK |  |  |  |  |  |  |

■PAPER ORIENTATION (CHECK ONE)

|  | AUTO | PORTRAIT | LANDSCAPE |
|---|---|---|---|
| CHECK |  |  |  |

■DENSITY (CHECK ONE)

|  | AUTO | DARK | ... | ... | ... | LIGHT |
|---|---|---|---|---|---|---|
| CHECK |  |  |  |  |  |  |

| SELECT FAX DESTINATION | | |
|---|---|---|
| CHECK | DESTINATION | NUMBER |
|  | TANAKA, TARO | 03-3333-1234 |
|  | YAMADA, HANAKO | 03-3333-2345 |
|  | YAMASHITA, JIRO | 03-3333-3456 |
|  | ⋮ | |
|  | UEDA, SABURO | 03-3333-4567 |

FIG. 11

| SELECT E-MAIL DESTINATION | | |
|---|---|---|
| CHECK | DESTINATION | ADDRESS |
|  | TANAKA, TARO | tanaka@xx.jp |
|  | YAMADA, HANAKO | yamada@yy.jp |
|  | YAMASHITA, JIRO | yamasita@zz.jp |
|  | ⋮ | |
|  | UEDA, SABURO | ueda@zz.com |

FIG. 12

| CHECK | DESTINATION TO SAVE |
|---|---|
| | ¥¥Server1 |
| | ¥¥Server1¥Folder1 |
| | ¥¥Server1¥Folder1¥Folder11 |
| | ¥¥Server1¥Folder1¥Folder12 |
| | ¥¥Server1¥Folder2 |
| | ¥¥Server2 |
| | ¥¥Server2¥Folder1 |
| | ¥¥Server2¥Folder2 |

SELECT DESTINATION TO SAVE SCANNED DATA

CONTROL APPARATUS, PROGRAM, COMPUTER-READABLE STORAGE MEDIUM, IMAGING APPARATUS CONTROL SYSTEM, AND CONTROL METHOD

This Nonprovisional application claims priority under 35 U.S.C. §119(a) on Patent Application No. 103318/2007 filed in Japan on Apr. 10, 2007, the entire contents of which are hereby incorporated by reference.

FIELD OF THE INVENTION

The present invention relates to a control apparatus, a control system, and a control method for controlling an imaging apparatus including a printing section for performing printing on a sheet, a document reading section for reading a sheet, a display section, and an operation section for accepting a user's operation.

BACKGROUND OF THE INVENTION

In recent years, copiers and printers have become multifunctional apparatuses capable of dealing with not only copy jobs and print jobs but also scan jobs and facsimile jobs. Such a multifunctional apparatus allows a user to configure desired settings for various items such as paper size, paper orientation, print quantity, print density, two-sided printing/one-sided printing, multiple page printing, print ratio, various post-processes (e.g., a sorting process and a stapling process), and a filing function, for example, in performing a copy job.

An ordinary multifunctional apparatus includes an operation panel for configuring such various settings for the multifunctional apparatus. However, most multifunctional apparatuses include simple operation panels. This forces users to bear the burden of pressing buttons many times for various operations such as an operation of shifting from one stratum to another. These problems are fully described in the following.

FIGS. 19 through 21 show examples of setting windows that are displayed on a touch panel of a multifunctional apparatus. For example, when a user instructs the multifunctional apparatus to perform a document reading process (scanning process), the user is required to view such a setting window as shown in FIG. 19 and set items such as paper size, paper orientation, print density, and print ratio. In so doing, the user is required to configure various settings by switching from one tab to another many times. Further, when the multifunctional apparatus is provided with an optional unit so as to have an additional function, the number of items to be set increases. This makes the user's operation more cumbersome and complicated.

For another example, in cases where a user sends a fax, the user is required to select the desired address from such an address list as shown in FIG. 20. In so doing, when the list contains a large number of registered addresses, the user is required not only to switch from one tab to another, but also to search for the desired address while scrolling through the window.

For still another example, in cases where the multifunctional apparatus is connectable to a network, a user is required to set the network by inputting various IP addresses to the multifunctional apparatus with reference to such a setting window as shown in FIG. 21. Also in such a case, the user is required to input the IP addresses with use of an operation panel to which he/she is unaccustomed.

Further, some multifunctional apparatuses for home use are provided with functions of reading various memory cards in which data indicative of images taken by digital cameras have been stored and directly printing an image without use of a personal computer. In order to print only a desired image selected from among a plurality of images stored in a memory card, such a multifunctional apparatus is arranged so as to show a list of thumbnail images to a user and accept the selection of the desired image.

However, as mentioned above, most multifunctional apparatuses include simple operation panels. This has caused such problems that thumbnail images cannot be displayed with sufficient resolution or that time is required for switching from one window to another or scrolling through a window in viewing and selecting a thumbnail image.

In order to solve such a problem, Patent Document 1 (Japanese Unexamined Patent Application Publication No. 247946/2006 (Tokukai 2006-247946; published on Sep. 21, 2006)) proposes a printing apparatus in which an order sheet listing thumbnail images is printed for a user to select a desired image from among a plurality of images and print the selected image and the user's selection is accepted by a scanner's scanning and analyzing the order sheet check-marked by the user. According to this printing apparatus, the order sheet contains a large number of thumbnail images printed thereon with high resolution. This allows the user to quickly view and select an image, thereby providing the user with a comfortable input environment.

However, the conventional technique has not succeeded in providing a truly user-friendly input environment.

As compared with an input method that involves an operation panel, an input method that involves printing and scanning of an order sheet is quick and comfortable in setting a large number of items or in selecting a desired option from among a large number of options. However, the latter input method requires a printing process of printing an image on a sheet and a scanning process of scanning an order sheet. Those processes may adversely require time. Therefore, such an input method is not necessarily comfortable.

Further, the method that involves an operation panel does not involve printing of an order sheet, and therefore is economical.

SUMMARY OF THE INVENTION

It is an object of the present invention to provide a more user-friendly input environment.

In order to attain the foregoing object, a control apparatus according to the present invention is a control apparatus for controlling an imaging device, including (a) a printing section for performing printing on a sheet, (b) a document reading section for reading a sheet, (c) a display section for displaying information, and (d) an operation section for accepting a user's operation, and allowing a user to use (i) a first input mode in which setting information serving as information to be acquired from a user is acquired by the display section's displaying a setting window for setting the setting information and by the operation section's accepting, from the user, an operation of designating the setting information and (ii) a second input mode in which the setting information is acquired by the printing section's printing an entry sheet and the document reading section's reading the entry sheet on which the user has written the setting information, the control apparatus including: selecting means for selecting either the first input mode or the second input mode when the imaging apparatus acquires the setting information from the user; and instructing means for instructing the imaging apparatus to acquire the setting information in the input mode selected by the selecting means.

Further, an imaging apparatus control system according to the present invention includes the aforementioned control apparatus and the imaging apparatus.

Further, a control method according to the present invention is a control method for controlling, with use of a control apparatus, an imaging apparatus, including (a) a printing section for performing printing on a sheet, (b) a document reading section for reading a sheet, (c) a display section for displaying information, and (d) an operation section for accepting a user's operation, and allowing a user to use (i) a first input mode in which setting information serving as information to be acquired from a user is acquired by the display section's displaying a setting window for setting the setting information and by the operation section's accepting, from the user, an operation of designating the setting information and (ii) a second input mode in which the setting information is acquired by the printing section's printing an entry sheet and the document reading section's reading the entry sheet on which the user has written the setting information, the control method including: a selecting step of, when the imaging apparatus acquires the setting information from the user, selecting either the first input mode or the second input mode; and an instructing step of instructing the imaging apparatus to acquire the setting information in the input mode selected by the selecting means.

The control apparatus according to the present invention controls the imaging apparatus and allowing a user to use (i) the first input mode in which the setting information is acquired from the user by displaying the setting window and accepting the operation and (ii) the second input mode in which the setting information is acquired from the user by preparing and scanning the entry sheet.

According to the foregoing arrangement, the control apparatus includes the selecting means for selecting either the first input mode or the second input mode in which the setting information is acquired from the user, and the instructing means instructs the imaging apparatus to acquire the setting information in the input mode selected by the selecting means. This means that the imaging apparatus acquires the setting information from the user by using a suitable one of the first input mode and the second input mode according to the situation. Therefore, a user-friendly input environment is provided.

Additional objects, features, and strengths of the present invention will be made clear by the description below. Further, the advantages of the present invention will be evident from the following explanation in reference to the drawings.

BRIEF DESCRIPTION OF THE DRAWINGS

FIG. 8 shows an example of an entry sheet that is outputted in selecting copying conditions.

FIG. 9 shows an example of an entry sheet that is outputted in selecting scanning conditions.

FIG. 10 shows an example of an entry sheet that is outputted in selecting a facsimile destination.

FIG. 11 shows an example of an entry sheet that is outputted in selecting an e-mail destination.

FIG. 12 shows an example of an entry sheet that is outputted in selecting a destination to save a scanned image.

DESCRIPTION OF THE EMBODIMENTS

Embodiment 1

1-1. Schematic Arrangement of a Multifunctional Apparatus Control System

Embodiment 1 of the present invention will be described below with reference to FIGS. 1 through 11. In a multifunctional apparatus control system of the present embodiment, the operation of a multifunctional apparatus is controlled by a control server via a communication network.

Figure 2:
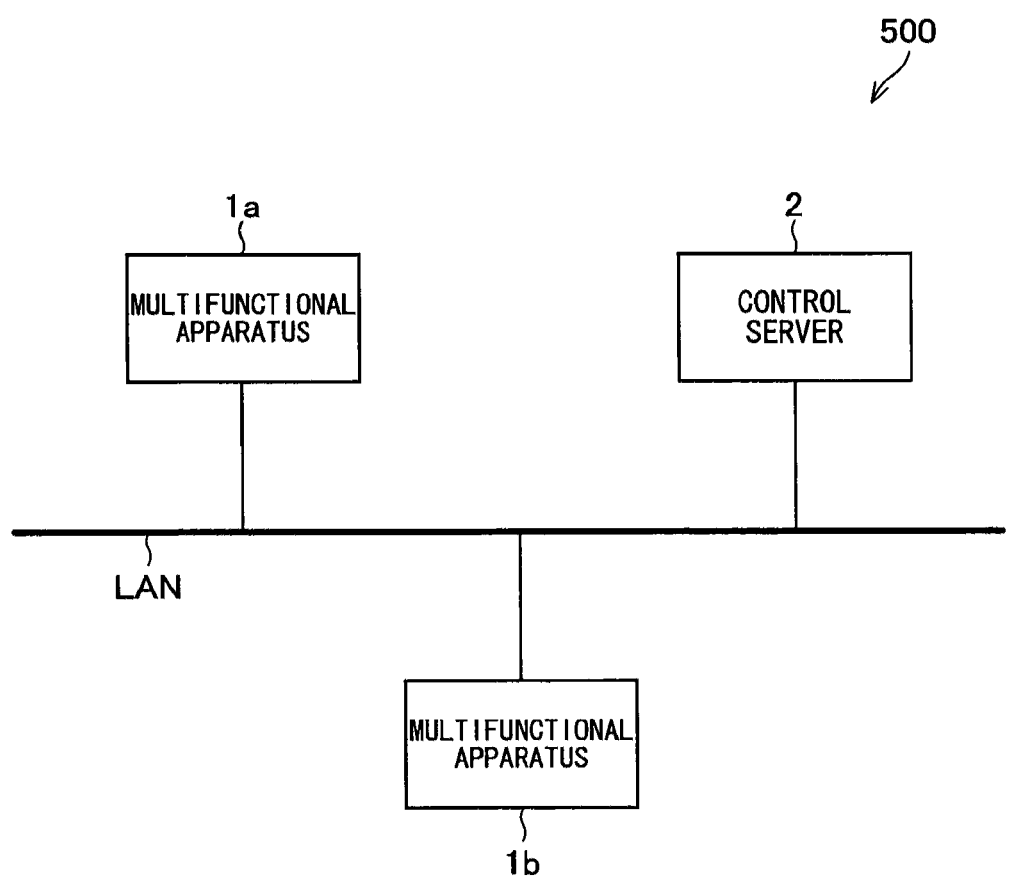
FIG. 2, showing an embodiment of the present invention, is a block diagram showing a schematic arrangement of a multifunctional apparatus control system.

FIG. 2, showing an embodiment of the present invention, is a block diagram showing a schematic arrangement of a multifunctional apparatus control system (hereinafter referred to simply as "control system"). As shown in FIG. 2, the control system 500 of the present embodiment includes plural (two in this embodiment) multifunctional apparatuses (imaging apparatuses) 1a and 1b and a single control server (control apparatus) 2. The control system is provided with a local area network (LAN) that enables communication between the multifunctional apparatuses 1a and 1b and the control sever 2. The multifunctional apparatuses 1a and 1b and the control sever 2 are each connected to the LAN.

As a transmission medium of the LAN, various transmission media can be used. Examples of the transmission media include cable media such as Ethernet®, an optical fiber, and a telephone line or wireless media. Moreover, the present embodiment uses the TCP/IP (Transmission Control Protocol/Internet Protocol) as a communication protocol for the LAN. The TCP/IP is a standard protocol for the Internet or an intranet.

The number of multifunctional apparatuses 1 to be contained in the control system may be 1 or not less than 3. Similarly, the number of control servers 2 is not limited to 1.

Each of the multifunctional apparatuses 1a and 1b can execute various jobs involving image formation and/or image processing. Examples of jobs involving image formation include a print job, and examples of jobs involving image processing include a scan job, a Scan to E-mail job (image reading and transmitting job), a facsimile job, and a PC (personal computer) facsimile job. Furthermore, examples of jobs involving a combination of image formation and image processing include a copy job. The term "print job" here refers to a job of performing printing in accordance with image data, stored in the multifunctional apparatus 1a or 1b, which indicates an original document previously scanned by the multifunctional apparatus 1a or 1b, or in accordance with print data received from a PC (not shown) or the like. Further, the term "Scan to E-mail job" here refers to a job of emailing, to a desired destination, image data obtained by causing the multifunctional apparatus 1a or 1b to scan an original document. The term "PC facsimile job" here refers to a job in which an image received from a PC (not shown) or the like via the LAN is transmitted to a desired destination via a public network by causing the multifunctional apparatus 1a or 1b to perform a facsimile function.

The control server 2 is constituted by an ordinary personal computer. In the control system of the present embodiment, neither of the multifunctional apparatuses 1a and 1b executes a job on its own. Instead, the multifunctional apparatuses 1a and 1b are arranged so as to execute each job under the control of the control server 2 via the LAN. That is, a job execution instruction received from a user via the multifunctional apparatus 1a or 1b is transmitted to the control server 2, and the multifunctional apparatus 1a or 1b executes each job in accordance with a control command transmitted from the control server 2. Further, data indicative of a window to be displayed on an operation panel (described below) of the multifunctional apparatus 1a or 1b is also transmitted from the control server 2.

In the present embodiment, the control server 2 constituted by an ordinary PC controls operations (inclusive of jobs) of the plural multifunctional apparatuses 1a and 1b, so that a flexible system can be built and various types of information (inclusive of statistical information such as status of use of jobs) can be centrally managed.

1-2. Arrangement of Each of the Multifunctional Apparatuses

Figure 3:
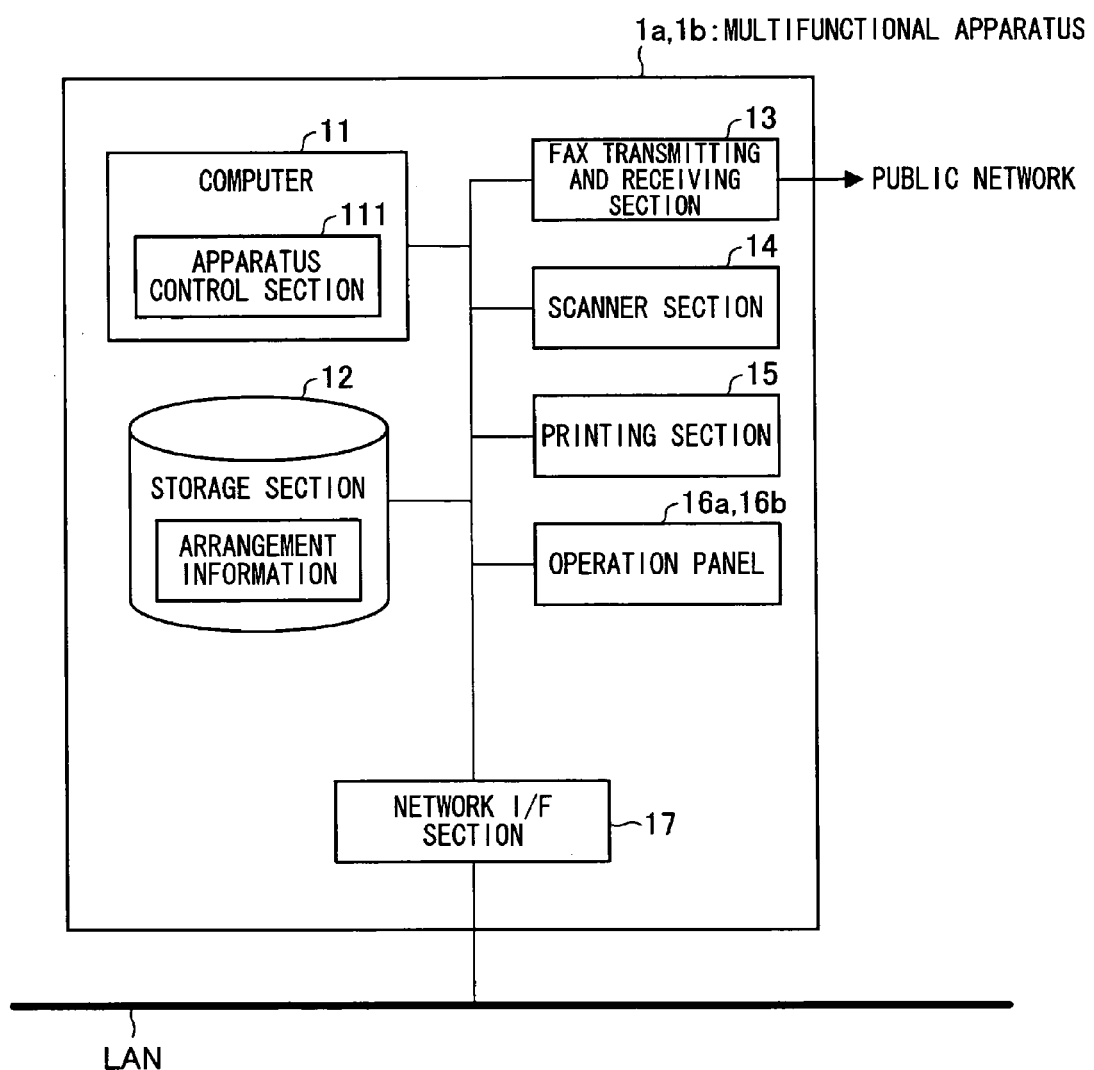
FIG. 3, showing an embodiment of the present invention, is a functional block diagram showing an arrangement of a multifunctional apparatus.

FIG. 3 is a block diagram showing an arrangement of each of the multifunctional apparatuses 1a and 1b. In the present embodiment, the multifunctional apparatuses 1a and 1b differ only in display capacity of operation panels described below and identical in other arrangements. Therefore, these arrangements are collectively described.

As shown in FIG. 3, each of the multifunctional apparatuses 1a and 1b includes a computer 11, a storage section 12, a facsimile transmitting and receiving section (hereinafter referred to as "FAX transmitting and receiving section) 13, a scanner section 14, a printing section 15, and a network interface section (hereinafter referred to as "network I/F section) 17. The multifunctional apparatuses 1a and 1b also include operation panel 16a and 16b, respectively.

The FAX transmitting and receiving section 13 is a hardware device for sending and receiving faxes, and is connected to a public network. The scanner section 14 is a hardware device for acquiring image data by optically reading an original document placed on a platen glass (not shown) of the multifunctional apparatus 1a or 1b. The printing section 15 is a hardware device for forming a desired image on a sheet of recording paper, for example, with use of an electrophotographic method or an inkjet method. The network I/F section 17 is a hardware device for the multifunctional apparatus 1a or 1b to communicate with the control server 2 via the LAN.

Figure 4:
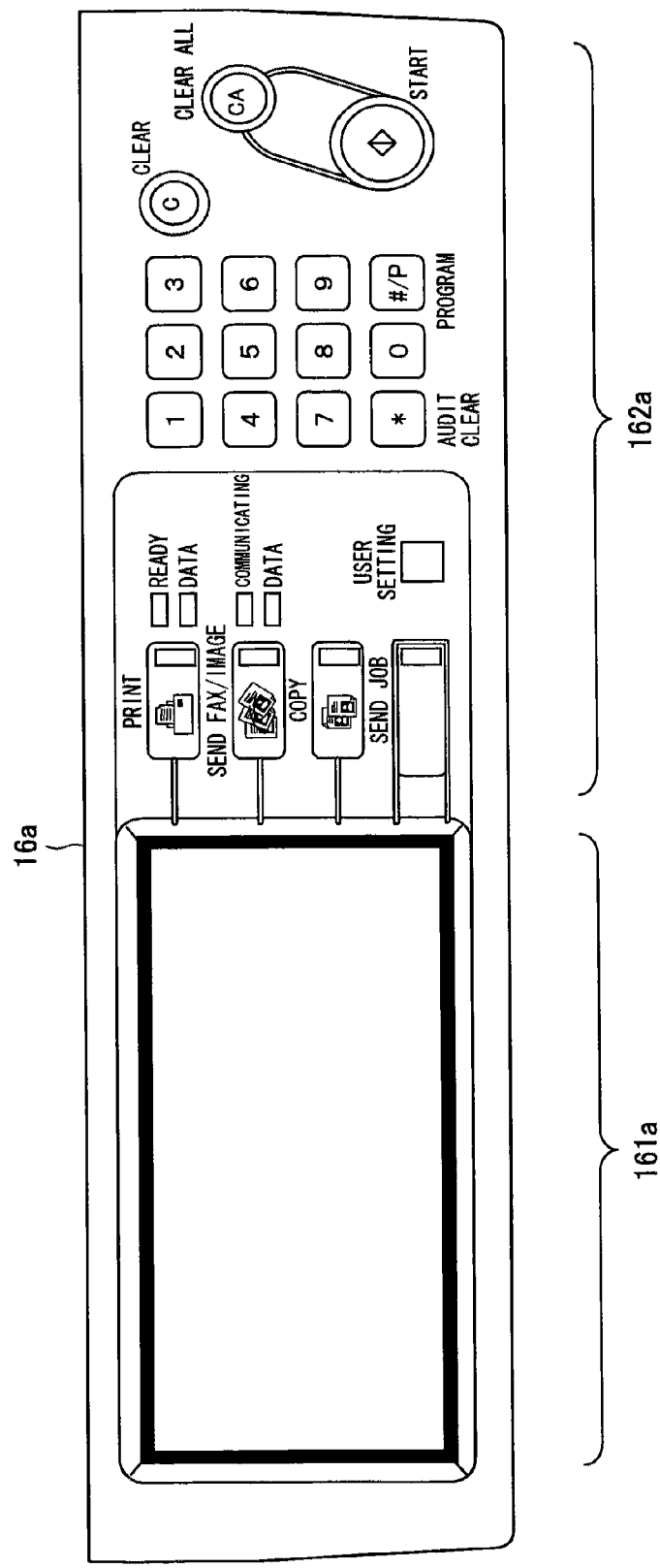
FIG. 4 is a plan view showing an example of an operation panel that is provided in the multifunctional apparatus.

FIG. 4 is a plan view showing a structure of the operation panel 16a of the multifunctional apparatus 1a. As shown in FIG. 4, the operation panel 16a of the multifunctional apparatus 1a has a touch panel 161a and hard keys 162a. The touch panel 161a displays a message for notifying a user of information, buttons (soft keys) for accepting an operation from the user, and the like. Moreover, the user can give instructions to the multifunctional apparatus 1a by touching various buttons displayed on the touch panel 161a. That is, the touch panel 161a functions both as a display section for showing various types of information to the user and an operation section for accepting an operation from the user. Further, the user can give instructions to the multifunctional apparatus 1a by pressing the hard keys 162a.

Figure 5:
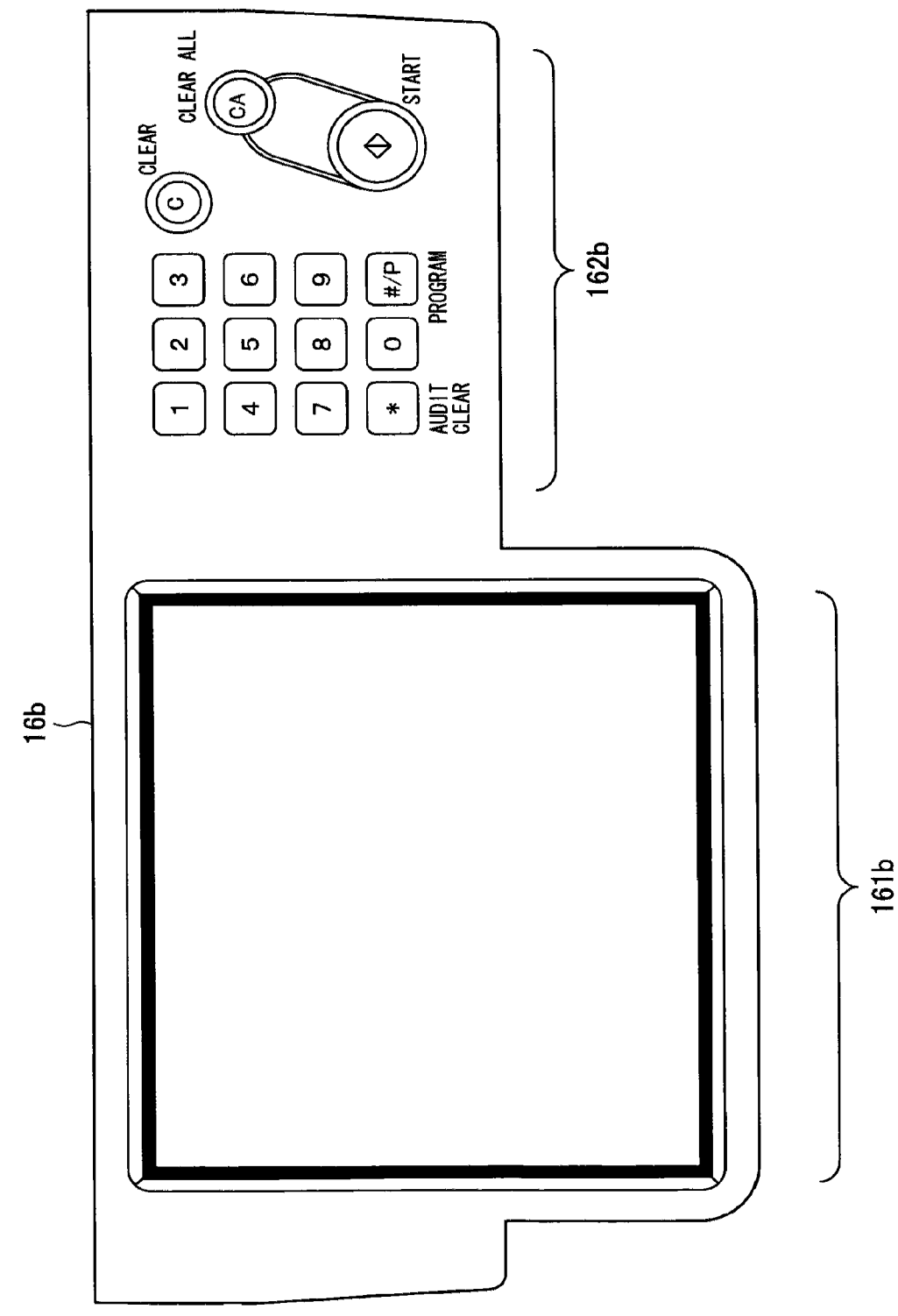
FIG. 5 is a plan view showing another example of an operation panel that is provided in the multifunctional apparatus.

FIG. 5 is a plan view showing a structure of the operation panel 16b of the multifunctional apparatus 1b. As shown in FIG. 5, the operation panel 16b of the multifunctional apparatus 1b includes a touch panel 161b and hard keys 162b as with the operation panel 16a of the multifunctional apparatus 1a. It should be noted here that the touch panel 161b of the multifunctional apparatus 1b is larger in size and higher in resolution than the touch panel 161a of the multifunctional apparatus 1a.

The storage section 12 is constituted, for example, by a flash memory or an HDD (hard disk drive) (both not shown), and has various types of information stored therein. Examples of the information stored in the storage section 12 include arrangement information indicative of the type of an optional unit attached to the multifunctional apparatus 1a or 1b and the performance of each component (e.g., resolution of the aforementioned touch panel 161a or 161b) of the multifunctional apparatus 1a or 1b.

The computer 11 has a CPU (Central Processing Unit) and a RAM (Random Access Memory) (both not shown), and the CPU realizes various functions by executing a control program loaded into the RAM. In the present embodiment, the CPU realizes an apparatus control section 111 by executing the control program.

The apparatus control section 111 controls the network I/F section 17 so that the multifunctional apparatus 1a or 1b exchanges various data with the control server 2. The apparatus control section 111 controls the FAX transmitting and receiving section 13, the scanner section 14, and the printing section 15 so that the multifunctional apparatus 1a or 1b executes various jobs. The apparatus control section 111 controls the operation panel 16a or 16b so that the multifunctional apparatus 1a or 1b dialogues with the user.

The multifunctional apparatus 1a or 1b accepts job setting information from the user before executing various jobs. For example, before executing a copy job, the multifunctional apparatus 1a or 1b accepts setting information that the user has inputted for various items such as paper size, paper orientation, print quantity, print density, two-sided printing/one-sided printing, multiple page printing, print ratio, various post-processes (e.g., a sorting process and a stapling process), and a filing function. It should be noted here that the user can input such setting information to the multifunctional apparatus 1a or 1b by either of the following two methods.

One of the two methods involves use of the conventional publicly-known operation panel 16a or 16b. According to this method, the apparatus control section 111 of the multifunctional apparatus 1a or 1b first causes the touch panel 161a or 161b of the operation panel 16a or 16b to display a setting window that displays a list of setting information options available to the user or an entry field that prompts the user to input setting information. The user views the setting window, and selects desired setting information from among the options or inputs setting information to the entry field by pressing the soft keys displayed on the touch panel 161a or 161b or the hard keys 162a or 162b. This method is hereinafter referred to as "first input mode".

The other one of the two methods involves use of an entry sheet. According to this method, the printing section 15 of the multifunctional apparatus 1a or 1b prepares an entry sheet by performing printing under the control of the apparatus control section 111. Printed on the entry sheet are a list of setting information options available to the user or a space that prompts the user to write setting information. The user views the entry sheet, and uses a writing instrument to check-mark desired setting information contained in the list, to enter a code for designating desired setting information, or to write setting information directly in the space. Then, when the entry sheet thus completed is set on the multifunctional apparatus 1a or 1b by the user, the scanner section 14 of the multifunctional apparatus 1a or 1b scans the entry sheet under the control of the apparatus control section 111, so that the setting information is acquired in accordance with a result of the scanning. This method is hereinafter referred to as "second input mode".

Each of the multifunctional apparatuses 1a and 1b executes various jobs in accordance with setting information inputted as described above.

1-3. Arrangement of the Control Server

Figure 1:
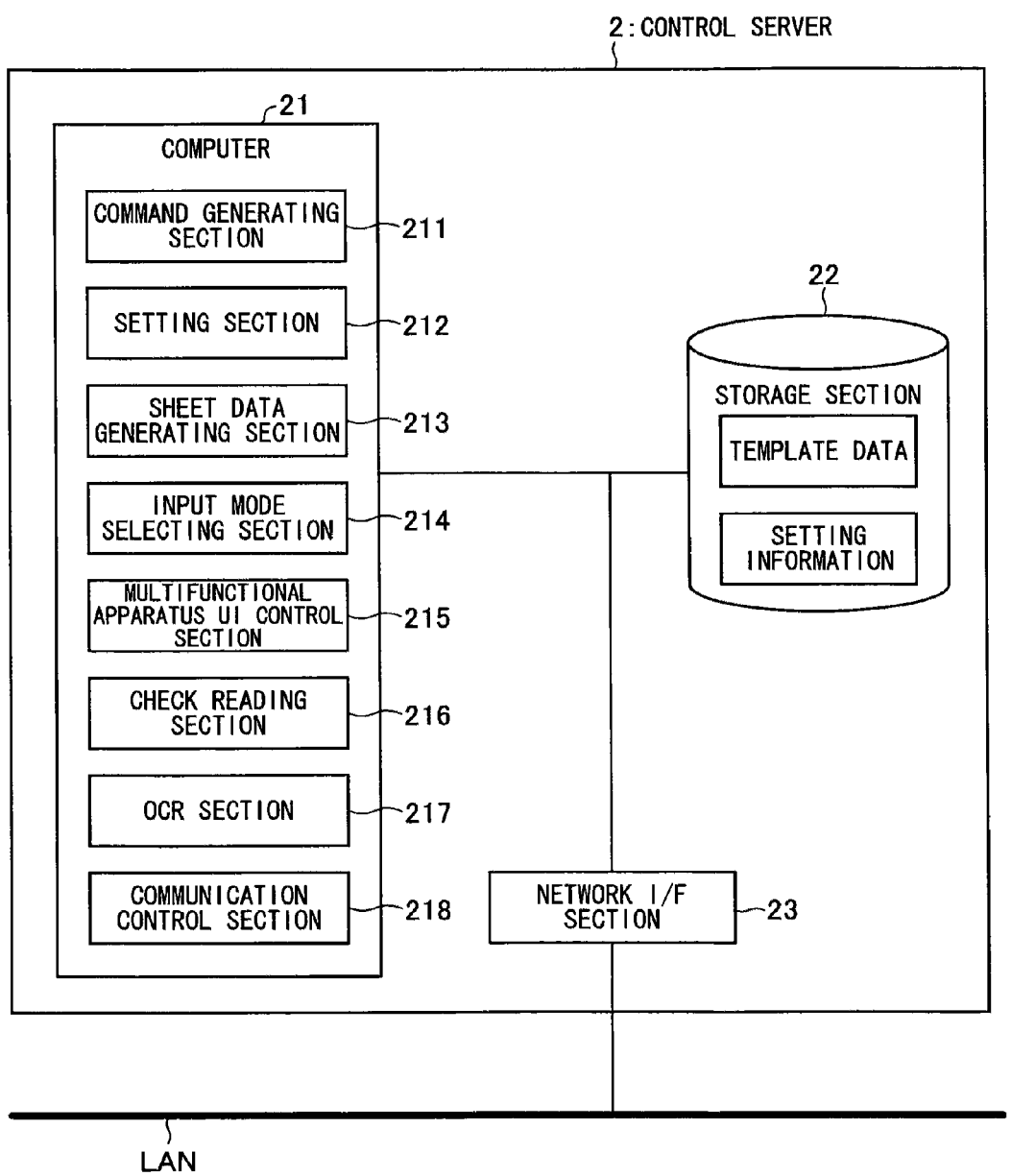
FIG. 1, showing an embodiment of the present invention, is a functional block diagram showing an arrangement of a control server.

FIG. 1, showing an embodiment of the present invention, is a block diagram showing an arrangement of the control server 2. As shown in FIG. 1, the control server 2 includes a computer 21, a storage section 22, and a network I/F section 23. It should be noted that the control server 2 may further include a display monitor, a keyboard, and/or a mouse in order to dialogue with a user. The network I/F section 23 is a hardware device for the control server 2 to communicate with the multifunctional apparatuses 1a and 1b via the LAN.

The storage section 22 is constituted by an HDD (not shown) or the like, and has various types of information stored therein. Examples of the information stored in the storage section 22 include template data indicative of an image that is displayed on the touch panel 161a or 161b of the multifunctional apparatus 1a or 1b and setting information acquired in the aforementioned first or second input mode. It is should be noted that the template data is obtained by embedding a script in a markup language such as HTML.

The computer 21 has a CPU and a RAM (both not shown), and the CPU realizes various functions by executing a program loaded into the RAM. In the present embodiment, the CPU realizes a command generating section (instructing means) 211, a setting section 212, a sheet data generating section 213, an input mode selecting section (selecting means) 214, a multifunctional apparatus user interface control section (hereinafter referred to as "multifunctional apparatus UI control section) (instructing means) 215, a check reading section 216, an OCR (Optical Character Reader) section 217, and a communication control section 218 by executing the control program.

That is, the control server 2 includes: a CPU for executing an instruction of a control program for realizing various functions; a ROM in which the program has been stored; a RAM for expanding the program; and a storage device (storage medium), such as a memory, in which the program and various data are stored. The object of the present invention can also be achieved by providing the control server 2 with a storage medium in which a program code (executable program, intermediate code, or source program) of the control program of the control server 2 has been stored in a computer readable manner, and by causing the computer (CPU or MPU) 21 to read and execute the program code stored in the storage medium, the program code serving as software for realizing the functions of the blocks 211 to 218 described below in detail. The same applies to the multifunctional apparatuses 1a and 1b.

Examples of the storage medium include: a tape such as a magnetic tape or a cassette tape; a magnetic disk such as a Floppy® disk or a hard disk; an optical disk such as a CD-ROM, an MO, an MD, a DVD, or a CD-R; a card such as an IC card (inclusive of a memory card) or an optical card; and a semiconductor memory such as a mask ROM, an EPROM, an EEPROM, or a flash ROM.

Further, the program code may be supplied to the control server 2 via a communication network. Examples of the communication network include, but are not particularly limited to, the Internet, an intranet, an extranet, a LAN (local area network), an ISDN (integrated services digital network), a VAN (value added network), a CATV (cable TV) communication network, a virtual private network, a telephone network, a mobile communication network, and a satellite communication network. Further, usable examples of a transmission medium that constitutes the communication network include, but are not particularly limited to, a cable medium such as IEEE 1394, a USB, power line communication, a cable TV line, a telephone line, or an ADSL line and a wireless medium such as IrDA, infrared rays used for a remote controller, Bluetooth®, IEEE 802.11, HDR (High Data Rate), a mobile phone network, satellite connection, or a terrestrial digital network. It should be noted that the present invention can also be realized in the form of a computer data signal realized by electronic transmission of the program code and embedded in a carrier wave.

The command generating section 211 generates a control command for instructing the multifunctional apparatus 1a or 1b to perform various processes including a process of executing a job. A control command for instructing the multifunctional apparatus 1a or 1b to execute a job contains instruction information indicative of the type of job that the multifunctional apparatus 1a or 1b is instructed to execute and setting information that is required in executing the job.

When the multifunctional apparatus 1a or 1b is instructed to execute the job, the setting section 212 reads out the setting information from the storage section 22 and outputs it to the command generating section 211.

The input mode selecting section 214 decides, in accordance with predetermined conditions, whether the aforementioned first or second input mode is used in acquiring the setting information from the user. It should be noted that a feature arrangement of the present invention is to switch between the two input modes in accordance with a predetermined condition. In the present embodiment, the input mode selecting section 214 decides, in accordance with the resolution of the touch panels 161a or 161b of the multifunctional apparatuses 1a or 1b, whether the aforementioned first or second input mode is used.

The multifunctional apparatus UI control section 215 generates operation window data indicative of an operation window (inclusive of a setting window) that is displayed on the touch panel of the multifunctional apparatus 1a or 1b and generates a control command for instructing the multifunctional apparatus 1a or 1b to display the operation window. Further, the multifunctional apparatus UI control section 215 also interprets operation information accepted from the user via the operation panel 16a or 16b of the multifunctional apparatus 1a or 1b. The operation window data is generated by appropriately combining template data stored in the storage section 22 and customizing the combined template data in accordance with scripts embedded in the template data. The operation window data is also described by a markup language such as HTML.

The sheet data generating section 213 generates print data indicative of an image that is printed on a sheet so that an entry sheet is prepared for use in the second input mode. In generating the print data, the sheet data generating section 213 uses the template data stored in the storage section 22, as with the aforementioned multifunctional apparatus UI control section 215.

The check reading section 216 and the OCR section 217 functions in cooperation with each other to specify the user's desired setting information by analyzing image data obtained from the scanning section 14 of the multifunctional apparatus 1a or 1b by scanning an entry sheet completed by the user. More specifically, the check reading section 216 extracts a check mark contained in the entry sheet, and specifies the setting information in accordance with the position of the check mark thus extracted. Further, the OCR section 217 recognizes a character printed on the entry sheet, and identifies for what item the entry sheet requires setting information. Alternatively, the OCR section 217 specifies the setting information by recognizing a character written in a space.

The communication control section 218 exchanges information with the multifunctional apparatus 1a or 1b by controlling the network I/F section 23. Examples of information that the communication control section 218 transmits to the multifunctional apparatus 1a or 1b include a control command generated by the command generating section 211, entry-sheet print data generated by the sheet data generating section 213, operation window data generated by the multifunctional apparatus UI control section 215, and print data indicative of various images that are printed by the multifunctional apparatus 1a or 1b. Further, examples of information that the communication control section 218 receives from the multifunctional apparatus 1a or 1b include various types of operation information accepted from a user via the operation panel 16a or 16b of the multifunctional apparatus 1a or 1b, scanned image data obtained from the scanning section 14 of the multifunctional apparatus 1a or 1b by scanning a copy source document or an entry sheet, and arrangement information indicative of the arrangement of the multifunctional apparatus 1a or 1b.

1-4. Process Flow of the Control System

Figure 6:
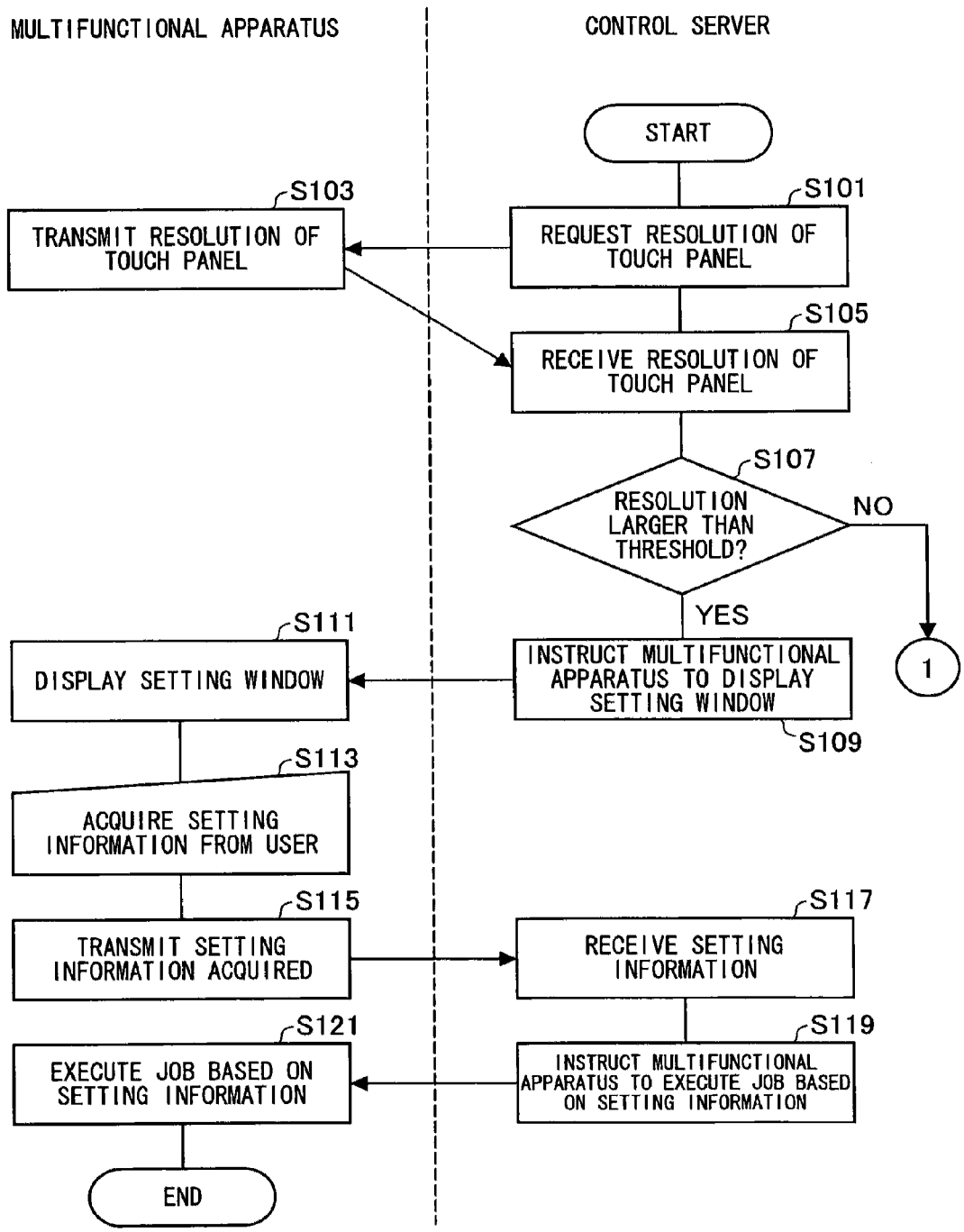
FIG. 6, showing an embodiment of the present invention, is a flow chart showing the first half of process steps that are taken in the multifunctional apparatus control system.
Figure 7:
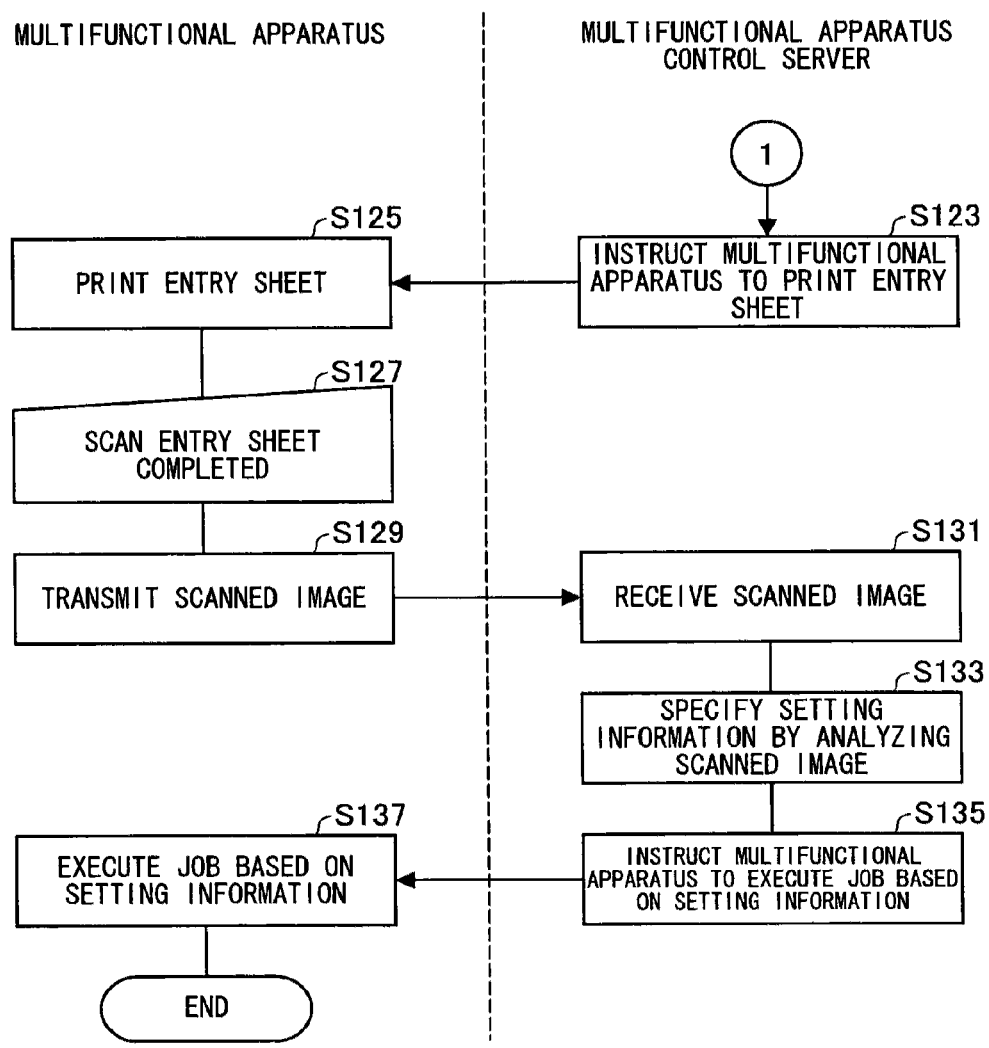
FIG. 7, showing Embodiment 1 of the present invention, is a flow chart showing the second half of the process steps that are taken in the multifunctional apparatus control system.

The following describes the flow of a process that is performed in the control system of the present embodiment. FIGS. 6 and 7 are flow charts showing process steps that are taken in the control system of the present embodiment.

First, when a user operates the operation panel 16a or 16b of the multifunctional apparatus 1a or 1b to select a job that he/she wishes to perform, job identification information indicative of the job thus selected is transmitted to the control server 2. The communication control section 218 of the control server 2, which has received the job identification information, requests resolution information indicative of the touch panel 161a or 161b from the multifunctional apparatus 1a or 1b from which the job identification information has been transmitted (S101).

The apparatus control section 111 of the multifunctional apparatus 1a or 1b, which has received the request, reads out resolution information indicative of the resolution of the corresponding touch panel 161a or 161b from among the arrangement information stored in the storage section 12, and transmits, to the control server 2, the resolution information thus read out (S103). Then, the communication control section 218 of the control server 2 receives the resolution information (S105) and sends it to the input mode selecting section 214.

Next, the input mode selecting section 214 determines whether the resolution indicated by the resolution information thus received exceeds a predetermined resolution (S107). In cases where the resolution exceeds the predetermined resolution (Y in S107), the touch panel 161a or 161b being operated by the user is judged to have sufficient resolution, so that the input mode selecting section 214 selects the first input mode.

When the input mode selecting section 214 selects the first input mode, the multifunctional apparatus UI control section 215 generates setting window data indicative of a setting window that prompts the user to select or input setting information and a control command for instructing the multifunctional apparatus 1a or 1b to display the setting window. Then, the communication control section 218 transmits, to the multifunctional apparatus 1a or 1b, the setting window data and the control command generated by the multifunctional apparatus UI control section 215 (S109).

Upon receiving the command and the setting window data from the control server 2, the multifunctional apparatus 1a or 1b displays the setting window on its own touch panel 161a or 161b in accordance with the setting window data thus received (S111).

The user, who has viewed the setting window, designates a desired setting or inputs setting information by operating the operation panel 16a or 16b. In other words, the multifunctional apparatus 1a or 1b acquires the setting information from the user via the operation panel 16a or 16b (S113). Then, the multifunctional apparatus 1a or 1b transmits, to the control server 2, the setting information thus acquired (S115).

The setting information is received by the communication control section 218 of the control server 2 and stored in the storage section 22. Then, the setting section 212 reads the setting information from the storage section 22 and sends it to the command generating section 211. Upon receiving the setting information, the command generating section 211 generates a control command containing instruction information for instructing the multifunctional apparatus 1a or 1b to execute the job selected by the user and the setting information, and the communication control section 218 transmits the control command to the multifunctional apparatus 1a or 1b (S119).

Upon receiving the control command, the multifunctional apparatus 1a or 1b executes, in accordance with the setting information contained in the control command, the job indicated by the instruction information contained in the control command (S121). For example, in cases where the job selected by the user in the beginning is a copy job, the scanner section 14 scans an original document, and the printing section 15 prints the resulting scanned image on a sheet of recording paper. It should be noted here that the copying conditions such as paper size and copy quantity comply with the setting information acquired from the user in Step S113. Then, the process is terminated.

On the other hand, in cases where it is determined in Step S107 that the resolution does not exceed the predetermined resolution, the touch panel 161a or 161b being operated by the user is judged to have insufficient resolution, so that the input mode selecting section 214 selects the second input mode. When the input mode selecting section 214 selects the second input mode, the sheet data generating section 213 generates entry-sheet print data indicative of an entry sheet that prompts the user to select or input setting information. The entry-sheet print data is identical in format to print data for use in a normal print job. Then, the command generating section 211 generates a control command for instructing the multifunctional apparatus 1a or 1b to print the entry sheet. The communication control section 218 transmits, to the multifunctional apparatus 1a or 1b, the entry-sheet print data generated by the sheet data generating section 213 and the control command generated by the command generating section 211 (S123).

Then, the printing section 15 of the multifunctional apparatus 1a or 1b, which has received the control command and the entry-sheet print data from the control server 2, prepares the entry sheet by printing an image on a sheet of recording paper in accordance with the entry-sheet print data thus received (S125).

The user writes, on the entry sheet thus outputted, a check mark or code for designating the desired settings, or writes setting information directly in a space. Then, the user sets the completed entry sheet on the multifunctional apparatus 1a or 1b for scanning. The scanner section 14 of the multifunctional apparatus 1a or 1b scans the entry sheet (S127), and transmits the resulting scanned image data to the control server 2 (S129).

Then, the communication control section 218 of the control server 2 receives the scanned image data (S131). The check reading section 216 and the OCR section 217 analyze the scanned image data and specify the user's desired setting information (S133). The setting information thus specified is stored in the storage section 22. After that, the same process is performed as in Steps S119 to S121 described above.

1-5. Example

The following describes an example of the operation of the control system. In this example, the touch panel 161a of the multifunctional apparatus 1a has a resolution of a1×b1 pixels, and the touch panel 161b of the multifunctional apparatus 1b has a resolution of a2×b2 pixels (note a1<a2 and b1<b2). Moreover, the predetermined resolution for use in the determination in S107 described above is a0×b0 (note a1<a0<a2 and b1<b0<b2).

In cases where a user operates the multifunctional apparatus 1b to select a job, the input mode selecting section 214 judges in Step S107 that, since the resolution (a2×b2) of the touch panel of the multifunctional apparatus 1b is higher than the threshold (a0×b0), the touch panel of the multifunctional apparatus 1b has sufficient resolution, and therefore selects the first input mode. As a result, the process proceeds to Step S109. Then, the user inputs various types of setting information by operating the operation panel 16b.

On the other hand, in cases where a user operates the multifunctional apparatus 1a to select a job, the input mode selecting section 214 judges in Step S107 that, since the resolution (a1×b1) of the touch panel of the multifunctional apparatus 1a is lower than the threshold (a0×b0), the touch panel of the multifunctional apparatus 1a does not have sufficient resolution, and therefore selects the second input mode. As a result, the process proceeds to Step S123.

Then, in Step S125, an entry sheet for designating job setting information is printed. FIG. 8 shows an example of an entry sheet that is outputted when a user selects a copy job. As shown in FIG. 8, the entry sheet contains a list of possible options for each item of the copying conditions (paper size, paper orientation, and copy density), and each list of options is provided with spaces in which to write check marks.

Further, FIG. 9 shows an example of an entry sheet that is outputted when a user selects a scan job. As with the entry sheet of FIG. 8, this entry sheet also contains a list of possible options for each item of the scanning conditions, and each list of options is provided with spaces in which to write check marks.

Further, FIG. 10 shows an example of an entry sheet that is outputted when a user selects a facsimile job. This entry sheet contains a list of facsimile destinations (destination telephone numbers), and the user writes a check mark in a space corresponding to the desired destination. Further, FIG. 11 shows an examples of an entry sheet that is outputted when a user selects a Scan to E-mail job. This entry sheet contains a list of e-mail destinations (destination e-mail addresses).

Further, FIG. 12 shows an example of an entry sheet that is outputted when a user selects a scan job. This entry sheet contains a list of destinations to save image data obtained by scanning an original document, and the user writes a check mark in a space corresponding to the desired destination to save. In cases where the image data is saved in an HDD (not shown) of the multifunctional apparatus 1a or 1b, directory information contained in the HDD is designated as the destination to save. In cases where the image data is saved in an HDD of an external server of the multifunctional apparatus 1a or 1b, the server's address or a combination of the server's address and directory information is designated as the destination to save.

1-6. Advantages and Modified Examples of the Present Embodiment

As described above, the control server of the present embodiment is arranged such that: the input mode selecting section 214 receives the resolution information indicative of the resolution of the touch panel 161a or 161b of the multifunctional apparatus 1a or 1b having accepted a job, and chooses an input mode in accordance with the resolution indicated by the resolution information thus received. Moreover, the input mode selecting section 214 selects the first input mode in cases where the resolution of the multifunctional apparatus 1a or 1b is higher than the reference value, and selects the second input mode in cases where the resolution of the multifunctional apparatus 1a or 1b is lower than the reference value.

This makes it possible to automatically switch between the first input mode and the second input mode in accordance with the display capacity of a touch panel of a multifunctional having accepted a job. Therefore, a user who is operating a multifunctional apparatus having a touch panel of low resolution can input setting information to the multifunctional apparatus by using an entry sheet. This saves the user the trouble of frequently performing a process of scrolling through a window on an operation panel or a process of switching from one window to another on the operation panel. On the other hand, a user who is operating a multifunctional apparatus having a touch panel of high resolution can input setting information to the multifunctional apparatus by using an operation panel as is conventionally done. This saves the user the trouble of taking time in a process of printing an entry sheet or a process of scanning an entry sheet, and helps the user to save on costs of printing an entry sheet. Thus, according the present embodiment, a user-friendly operating environment is selected and provided in accordance with the display capacity of a touch panel of a multifunctional apparatus.

In the aforementioned example, when an input mode is chosen in accordance with the resolution of a touch panel, the total number of pixels obtained by multiplying the vertical resolution of the touch panel by the horizontal resolution of the touch panel is compared with the threshold. However, the present invention is not limited to this. For example, an input mode may be chosen by comparing only the vertical or horizontal resolution with the threshold.

Further, the same effect can be obtained by choosing an input mode in accordance with the size of a touch panel instead of the resolution of the touch panel. This arrangement solves such a problem that a touch panel that is high in resolution but small in size results in a hardly viewable window when the touch panel displays a large number of characters. Of course, an input mode may be chosen in accordance with a combination of the resolution and size of a touch panel.

Further, in the aforementioned embodiment, information that is acquired from a user is exemplified as setting information indicative of a job execution condition under which the multifunctional apparatus 1a or 1b performs a job. However, the information that is acquired from a user may be exemplified as follows.

In this modified example, the multifunctional apparatus 1a or 1b accepts a translation copy job. In the translation copy job, the multifunctional apparatus 1a or 1b acquires image data by causing the scanning section 14 to scan an original document, and transmits the image data to the control server 2. Then, the control server 2 converts the acquired image data into text data through character recognition by the OCR section 217, and transmits the text data to an external translation server (not shown). Upon receiving the text data, the translation server translates the text into another language by using a dictionary file, and transmits, to the control server 2, the text data thus translated. Then, the control server 2 prepares print data indicative of the text data, and controls the multifunctional apparatus 1a or 1b so that the multifunctional apparatus 1a or 1b prints the text data. The aforementioned input mode switching can be applied to input of setting information for designating a dictionary file and a translation language in such a translation copy job.

That is, the input mode switching can be applied to input of setting information indicative of a job execution condition for a job as long as the job is accepted via an operation panel of a multifunctional apparatus. This applies even if the job is executed by an external server other than the multifunctional apparatus. Furthermore, in addition to the input of setting information (job setting information) indicative of a job execution condition, the input mode switching may be applied to input of setting information (system setting information) for designating a system setting for the multifunctional apparatus 1a or 1b. Unlike a job execution condition, the system setting information is not information that must be set for each job execution instruction, but is information that basically does not need to be changed once it is set.

For example, in cases where the multifunctional apparatuses 1a and 1b are connected to a TCP/IP network as in the present embodiment, it is necessary to set each multifunctional apparatus for the network. Specifically, for example, it is necessary to set an IP address, a subnet mask, and a default gateway that are unique to each multifunctional apparatus. Also at the time of such network settings, the input mode switching can be applied. Furthermore, in addition to the network settings, the input mode switching can be applied to setting of a power-saving function of a multifunctional apparatus, input of date-and-time information, and the like.

Further, in S107, the input mode selecting section 214 may determine whether or not the resolution indicated by the resolution information is not less than a predetermined resolution. Moreover, the process may shift to S109 when the resolution is not less than the predetermined resolution, and may shift to S123 when the resolution is less than the predetermined resolution.

Embodiment 2

Embodiment 2 of the present invention will be described below with reference to FIGS. 13 and 14. A control system of the present embodiment is similar to the control system of Embodiment 1. Therefore, only parts different from those of the control system of Embodiment 1 will be described, and parts identical to those of the control system of Embodiment 1 will not be described. The same applies to the following embodiments. The control system of the present embodiment differs in a method by which the input mode selecting section 214 decides whether to select the first or second input mode. Specifically, the input mode selecting section 214 is arranged so as to decide in consideration of the printing performance of the printing section 15 of the multifunctional apparatus 1a or 1b and the display performance of the operation panel 16a or 16b.

Figure 13:
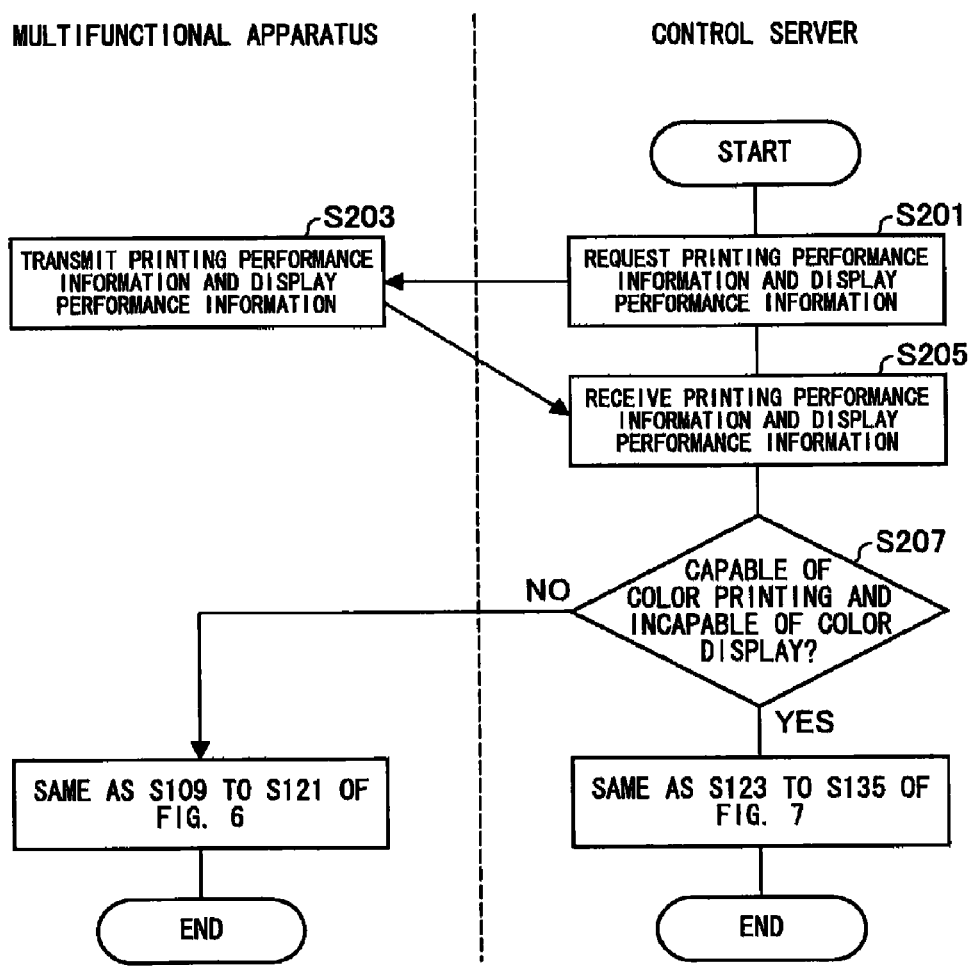
FIG. 13, showing Embodiment 2 of the present invention, is a flow chart showing process steps that are taken in the multifunctional apparatus control system.
Figure 14:
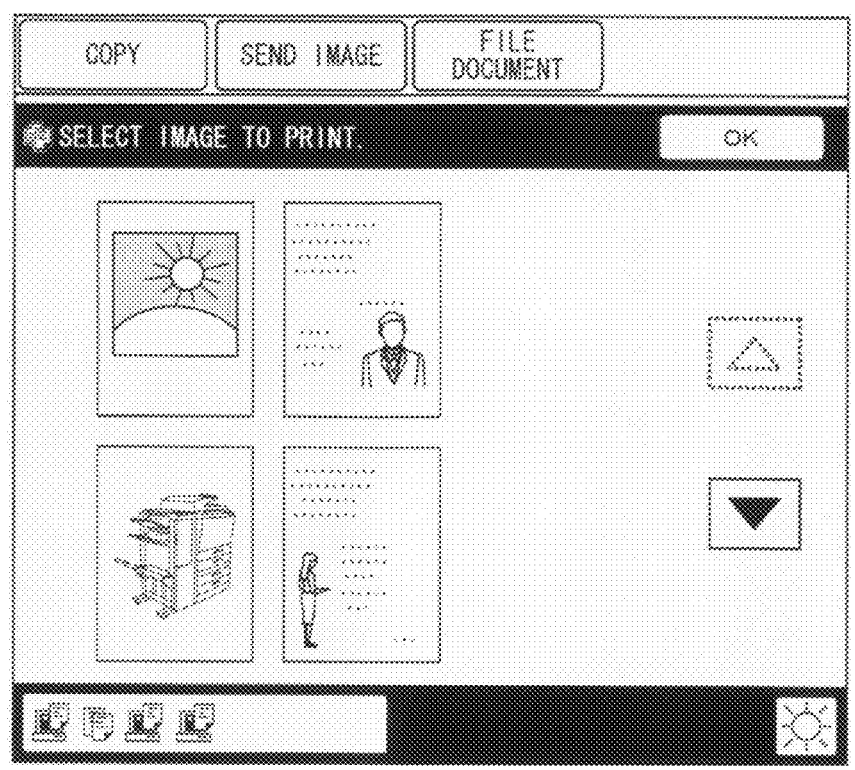
FIG. 14 shows an example of a window that is displayed on an operation panel in selecting an image to print.

FIG. 13 is a flow chart showing process steps that are taken in the control system of the present embodiment. First, when a user operates the operation panel 16a or 16b of the multifunctional apparatus 1a or 1b to select a job that he/she wishes to perform, job identification information indicative of the job thus selected is transmitted to the control server 2. The communication control section 218 of the control server 2, which has received the job identification information, requests, from the multifunctional apparatus 1a or 1b from which the job identification information has been transmitted, printing performance information indicative of whether the printing section 15 is capable of color printing and display performance information indicative of whether the touch panel 161a or 161b is capable of color display (S201).

The apparatus control section 111 of the multifunctional apparatus 1a or 1b, which has received the request, reads out, from among the arrangement information stored in the storage section 12, printing performance information indicative of whether the printing section 15 is capable of color printing and display performance information indicative of whether the touch panel 161a or 161b is capable of color display, and transmits, to the control server 2, the printing performance information and the display performance information thus read out (S203). Then, the communication control section 218 of the control server 2 receives the printing performance information and the display performance information (S205) and sends them to the input mode selecting section 214.

Next, the input mode selecting section 214 determines whether or not the printing performance information thus received indicates that the printing section 15 is capable of color printing and whether or not the display performance information thus received indicates that the touch panel 161a or 161b is incapable of color display (S207). In cases where the printing performance information indicates that the printing section 15 is capable of color printing and the display performance information indicates that the touch panel 161a or 161b is incapable of color display (Y in S207), the input mode selecting section 214 selects the second input mode. Otherwise, the input mode selecting section 214 selects the first input mode. It should be noted that setting information is acquired in each input mode in the same manner as described above in Embodiment 1.

The present embodiment is arranged such that a multifunctional apparatus 1a or 1b having a printing section 15 capable of color printing and a touch panel 161a or 161b capable of only monochrome display acquires setting information form a user in the second input mode. Therefore, the present embodiment is suitable to displaying a list of thumbnail images of color images (e.g., photographs) saved, for example, in a memory card inserted into the multifunctional apparatus 1a or 1b or in an HDD contained in the multifunctional apparatus 1a or 1b and accepting a user's selection.

The reason for this is as follows: even in cases where a user is operating the multifunctional apparatus 1a or 1b whose touch panel 161a or 161b is capable of only monochrome display, an entry sheet having a list of color thumbnail images printed thereon is outputted as long as the printing section 15 is capable of color printing; therefore, the user can view the color thumbnail images printed on the entry sheet and select an image that he/she wishes to print.

On the other hand, in cases where a user is operating a multifunctional apparatus 1a or 1b whose touch panel 161a or 161b is capable of color display and whose printing section 15 is capable of only monochrome printing, the touch panel displays a setting window that displays a list of thumbnail images in color. This allows the user to view the thumbnail images displayed in color and select an image that he/she wishes to print. For example, in cases where the touch panel 161b of the multifunctional apparatus 1b is capable of color display and a user selects a print job of printing a color image previously scanned by the multifunctional apparatus 1b, the touch panel 161b displays a list of thumbnail images in color as shown in FIG. 14.

Thus, as long as at least either a touch panel or a printing section is capable of color output, a user can always view and select a color thumbnail image, so that a user-friendly operating environment is provided.

Embodiment 3

Embodiment 3 of the present invention will be described below with reference to FIG. 15. A control system of the present embodiment differs in a method by which the input mode selecting section 214 decides whether to select the first or second input mode. Specifically, the input mode selecting section 214 is arranged so as to decide in consideration of the number of pieces of setting information that must be acquired from a user.

Figure 15:
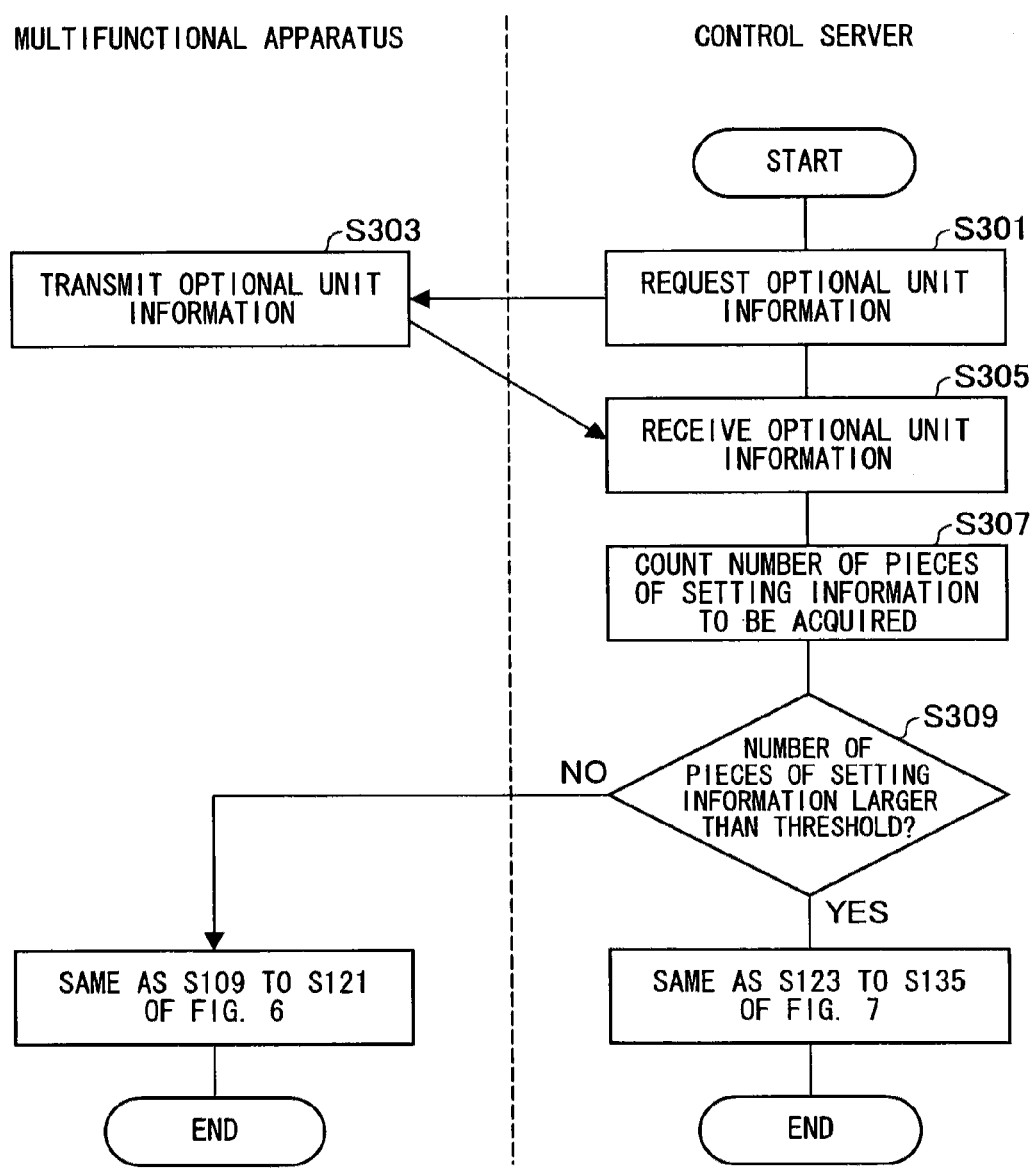
FIG. 15, showing Embodiment 3 of the present invention, is a flow chart showing process steps that are taken in the multifunctional apparatus control system.

FIG. 15 is a flow chart showing process steps that are taken in the control system of the present embodiment. First, when a user operates the operation panel 16a or 16b of the multifunctional apparatus 1a or 1b to select a job that he/she wishes to perform, job identification information indicative of the job thus selected is transmitted to the control server 2. The communication control section 218 of the control server 2, which has received the job identification information, requests, from the multifunctional apparatus 1a or 1b from which the job identification information has been transmitted, optional unit information indicative of the types of all optional units attached to the multifunctional apparatus 1a or 1b (S301).

It should be noted that examples of the optional units include a two-sided printing unit, an additional paper feed unit, and various post-processing units (e.g., a stapling process unit and a sorter unit).

The apparatus control section 111 of the multifunctional apparatus 1a or 1b, which has received the request, reads out, from among the arrangement information stored in the storage section 12, optional unit information indicative of a list of optional units mounted on the multifunctional apparatus 1a or 1b, and transmits, to the control server 2, the optional unit information thus read out (S303). Then, the communication control section 218 of the control server 2 receives the optional unit information (S205) and sends it to the input mode selecting section 214.

The input mode selecting section 214 calculates, from the job identification information acquired in the beginning and the optional unit information received in Step S205, the number of pieces of setting information to be acquired from the user (S307). For example, in cases where the number of optional units mounted on the multifunctional apparatus 1a or 1b is large, the number of pieces of setting information to be acquired from the user is large accordingly. Further, the number of pieces of setting information to be acquired also varies depending on the type of job.

Next, the input mode selecting section 214 determines whether or not the number of pieces of setting information to be acquired from the user is larger than a predetermined number (S309). In cases where the number of pieces of setting information to be acquired is larger than the predetermined number (threshold) (Y in S309), the input mode selecting section 214 selects the second input mode. Otherwise (N in S309), the input mode selecting section 214 selects the first input mode. It should be noted that setting information is acquired in each input mode in the same manner as described above in Embodiment 1.

The present embodiment is arranged such that in cases where the number of pieces of setting information to be acquired is large, the pieces of setting information are acquired from the user in the second input mode. This makes it unnecessary for the user to perform a cumbersome and complicated input operation with use of the operation panel 16a or 16b. On the other hand, in cases where the number of pieces of setting information to be acquired is small, the pieces of setting information are acquired from the user in the first input mode. This saves user the trouble of waiting a long time to prepare and scan an entry sheet, and helps the user to save on costs of printing an entry sheet.

Further, the number of setting items that need to be set in causing a multifunctional apparatus to execute a job varies depending on what type of optional unit is mounted. However, since the present embodiment is arranged such that the control server 2 acquires optional unit information from the multifunctional apparatus 1a or 1b, the present embodiment can accurately calculate the number of setting items.

Although the present embodiment is arranged so as to choose an input mode in accordance with the number of pieces of setting information to be acquired, the present embodiment may be modified in the following manner. That is, in cases where a list of setting information options is presented to the user and the user selects a desired option from the list, the input mode selecting section 214 may choose an input mode in accordance with the number of options that are presented to the user.

For example, in cases where a destination of an e-mail or of a fax is selected, the number of options increases as a larger number of such destinations are registered. Therefore, under the conventional technology, even when the number of pieces of setting information that a user wishes to finally input is 1, the user have had to select the desired setting information by scrolling through a window or switching from one window to another. However, in this modified example, the second input mode is selected in cases where the number of options that are presented to a user is larger than a threshold, and the first input mode is selected in cases where the number of options is smaller than the threshold. As a result, a user-friendly operating environment is provided depending on the situation.

Embodiment 4

Embodiment 4 of the present invention will be described below with reference to FIG. 16. A control system of the present embodiment differs in a method by which the input mode selecting section 214 decides whether to select the first or second input mode. Specifically, the input mode selecting section 214 is arranged so as to decide in accordance with whether or not it is necessary to present a thumbnail image to a user at the time of input of setting information.

Figure 16:
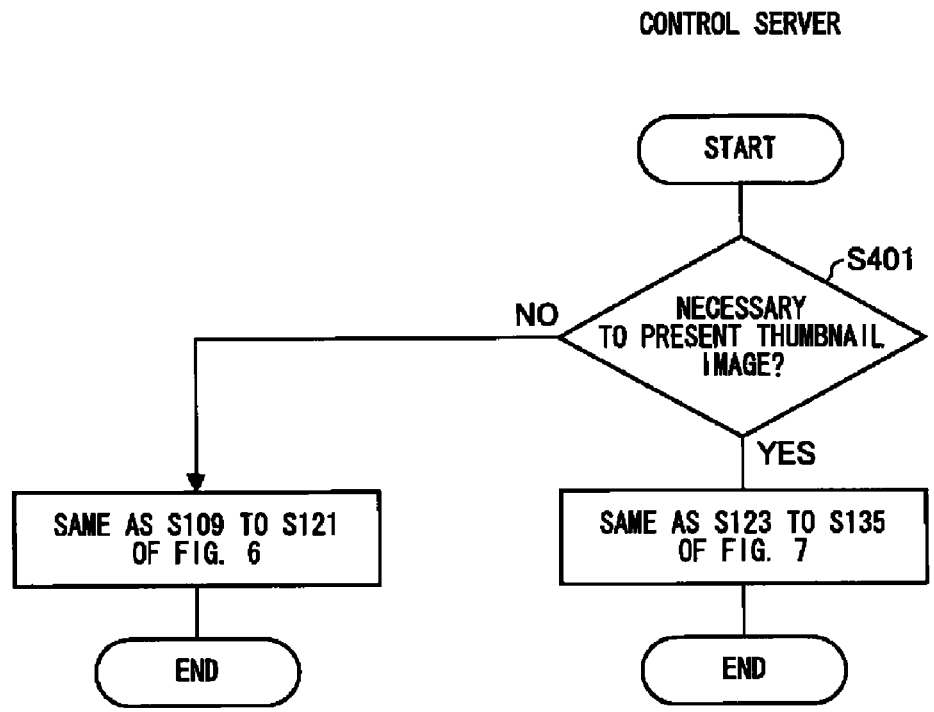
FIG. 16, showing Embodiment 4 of the present invention, is a flow chart showing process steps that are taken in the multifunctional apparatus control system.

FIG. 16 is a flow chart showing process steps that are taken in the control system of the present embodiment. First, when a user operates the operation panel 16a or 16b of the multifunctional apparatus 1a or 1b to select a job that he/she wishes to perform, job identification information indicative of the job thus selected is transmitted to the control server 2. When the communication control section 218 of the control server 2 receives the job identification information, the input mode selecting section 214 judges whether or not it is necessary to present a thumbnail image to the user in acquiring setting information from the user for execution of the job (S401).

The judgment process is fully described in the following. In the present embodiment, when the necessity of acquiring setting information from the user arises, the multifunctional apparatus UI control section 215 prepares setting window data to be transmitted to the multifunctional apparatus 1a or 1b. As described above, the setting window data is described by a markup language such as XHTML. The input mode selecting section 214 determines whether or not the setting window data prepared by the multifunctional apparatus UI control section 215 contains an image tag (e.g., "<IMG>") indicative of an image display. Then, in cases where the setting window data contains even a single image tag, the input mode selecting section 214 judges that it is necessary to present a thumbnail image to the user. In cases where the setting window data contains no image tag, the input mode selecting section 214 judges that it is not necessary to present a thumbnail image to the user.

Example of the cases where it is necessary to present a thumbnail image to the user include cases where, in a print job of printing an image (e.g., photograph) saved in a memory card inserted into the multifunctional apparatus 1a or 1b or in an HDD contained in the multifunctional apparatus 1a or 1b, a list of thumbnail images is presented to the user and the selection of an image that the user wishes to print is accepted from the user.

In cases where the input mode selecting section 214 judges in Step S401 that it is necessary to present a thumbnail image (Y in S401), the input mode selecting section 214 selects the second input mode, so that an entry sheet containing the thumbnail image is outputted. On the other hand, in cases where it is not necessary to present a thumbnail image (N in S401), the input mode selecting section 214 selects the first input mode, so that setting information is acquired via the operation panel 16a or 16b.

Thus, the present embodiment is arranged such that in cases where a list of thumbnail images is presented to a user, an entry sheet is outputted with the list of thumbnail images printed thereon. This allows the user to view the thumbnail images printed on the entry sheet with high resolution and quickly select an image that he/she wishes to print. In other words, the user does not need to select an image by viewing the touch panel 161a or 161b having low display capacity. This makes the user feel comfortable. On the other hand, in cases where no list of thumbnail images is presented to the user, the user can quickly input setting information via the operation panel 16a or 16b, and can save on costs of printing an entry sheet.

Embodiment 5

Embodiment 5 of the present invention will be described below with reference to FIG. 17. A control system of the present embodiment differs in a method by which the input mode selecting section 214 decides whether to select the first or second input mode. Specifically, the input mode selecting section 214 is arranged so as to decide in accordance with whether or not it is necessary to accept input of a character string from a user at the time of input of setting information.

Figure 17:
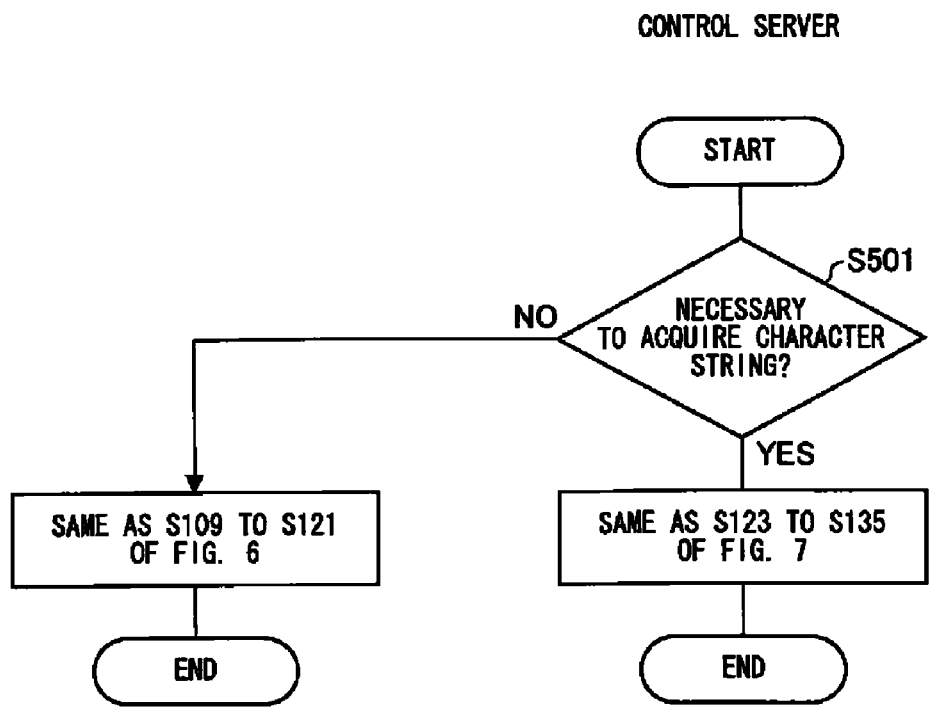
FIG. 17, showing Embodiment 5 of the present invention, is a flow chart showing process steps that are taken in the multifunctional apparatus control system.

FIG. 17 is a flow chart showing process steps that are taken in the control system of the present embodiment. First, when a user operates the operation panel 16a or 16b of the multifunctional apparatus 1a or 1b to select a setting item (e.g., a network setting or a power-saving setting) for which he/she wishes to input setting information, information (setting item information) indicative of the setting item thus selected is transmitted to the control server 2. When the communication control section 218 of the control server 2 receives the setting item information, the input mode selecting section 214 judges whether or not it is necessary to accept input of a character string from the user as setting information in acquiring setting information on the setting item indicated by the setting item information thus received (S510).

The judgment process is fully described in the following. In the present embodiment, when the necessity of acquiring setting information from the user arises, the multifunctional apparatus UI control section 215 prepares setting window data as in Embodiment 4. Then, the input mode selecting section 214 determines whether or not the setting window data prepared by the multifunctional apparatus UI control section 215 contains a character input tag (e.g., "<INPUT>") indicative of character input. Then, in cases where the setting window data contains even a single character input tag, the input mode selecting section 214 judges that it is necessary to accept input of a character string from the user. In cases where the setting window data contains no character input tag, the input mode selecting section 214 judges that it is not necessary to accept input of a character string from the user.

Examples the cases where it is necessary to accept input of a character sting from the user include a case where an IP address assigned to the multifunctional apparatus 1a or 1b is registered in setting a network and a case where an e-mail address or fax number and a name (individual name or company name) corresponding thereto are registered.

In cases where the input mode selecting section 214 judges in Step S501 that it is necessary to accept input of a character string from the user (Y in S501), the input mode selecting section 214 selects the second input mode, so that an entry sheet containing a space in which to write setting information is outputted. On the other hand, in cases where it is not necessary to accept input of a character string from the user (N in S501), the input mode selecting section 214 selects the first input mode, so that the touch panel 161a or 161b displays a list of selectable setting information and the operation panel 16a or 16b accepts the selection of setting information from the user.

Thus, the present embodiment is arranged such that in cases where input of a character string as setting information is accepted, an entry sheet provided with a space in which to write the character string is outputted. This allows the user to input setting information by writing the character string as setting information in the space provided on the entry sheet and causing the multifunctional apparatus 1a or 1b to scan the entry sheet thus completed. Usually, most multifunctional apparatuses are provided with simple operation panels, and therefore make it difficult to input a character string (especially nonnumeric characters such as alphabets, katakana, hiragana, and kanji). However, according to the foregoing arrangement, in cases where it is necessary to input a character string, the character string can be inputted with use of an entry sheet. This allows the user to quickly configure the settings.

In other cases, the first input mode is selected. This allows the user to quickly input setting information via the operation panel 16a or 16b and save on costs of printing an entry sheet.

Embodiment 6

Embodiment 6 of the present invention will be described below with reference to FIG. 18. A control system of the present embodiment is a modified example of Embodiment 1, and differs from Embodiment 1 in that a user can indicate a desired input mode.

Figure 18:
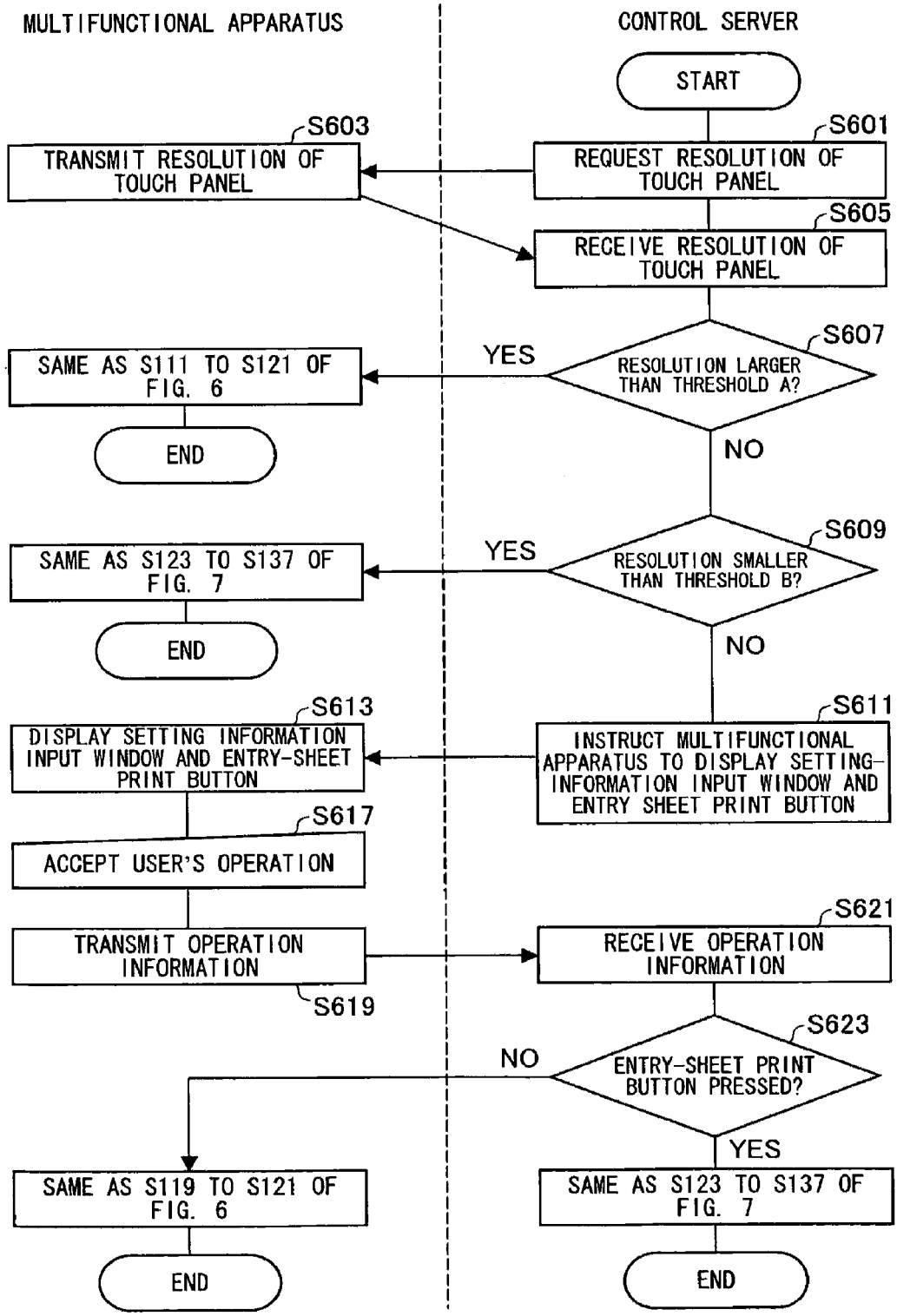
FIG. 18, showing Embodiment 6 of the present invention, is a flow chart showing process steps that are taken in the multifunctional apparatus control system.
Figure 19:
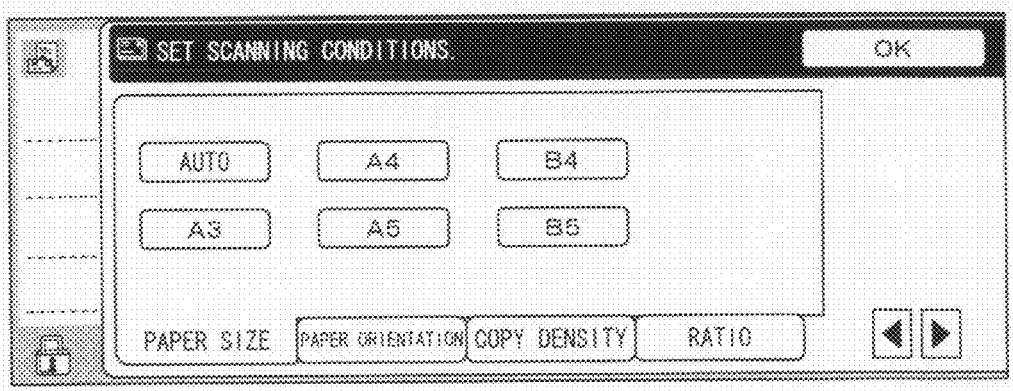
FIG. 19 shows an example of a window that is displayed on an operation panel in selecting scanning conditions.
Figure 20:
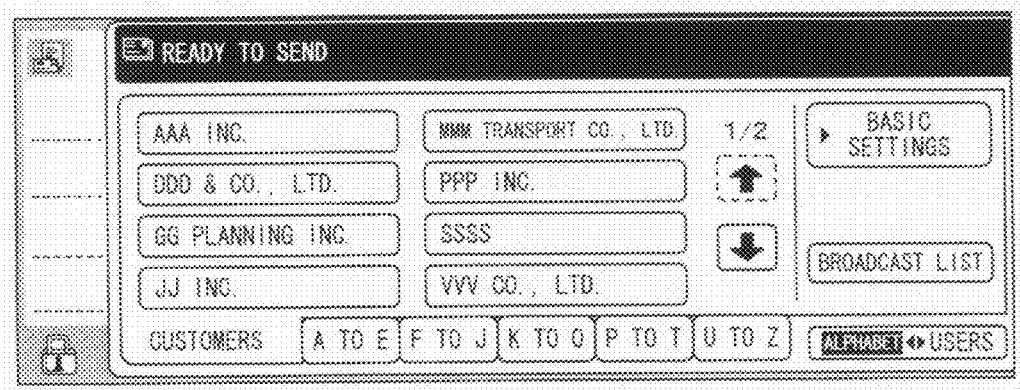
FIG. 20 shows an example of a window that is displayed on an operation panel in selecting a facsimile destination.
Figure 21:
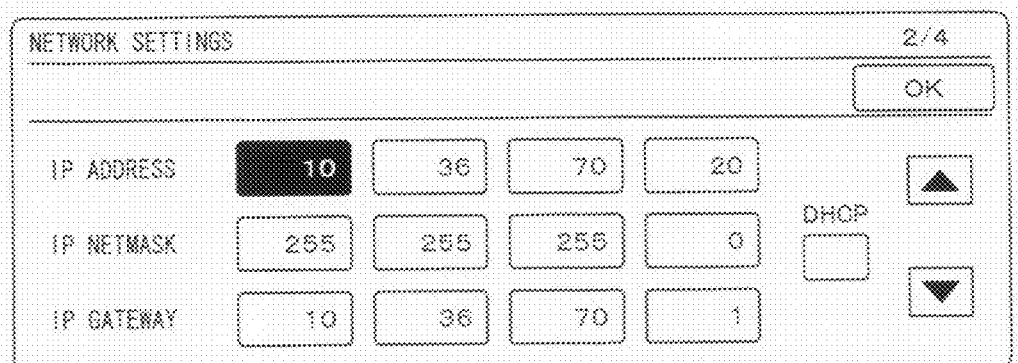
FIG. 21 shows an example of shows an example of a window that is displayed on an operation panel in setting a network.

FIG. 18 is a flow chart showing process steps that are taken in the control system of the present embodiment. First, when a user operates the operation panel 16a or 16b of the multifunctional apparatus 1a or 1b to select a job that he/she wishes to perform, job identification information indicative of the job thus selected is transmitted to the control server 2. The communication control section 218 of the control server 2, which has received the job identification information, requests resolution information indicative of the touch panel 161a or 161b from the multifunctional apparatus 1a or 1b from which the job identification information has been transmitted (S601).

The apparatus control section 111 of the multifunctional apparatus 1a or 1b, which has received the request, reads out resolution information indicative of the resolution of the corresponding touch panel 161a or 161b from among the arrangement information stored in the storage section 12 and transmits, to the control server 2, the resolution information thus read out (S603). Then, the communication control section 218 of the control server 2 receives the resolution information (S605) and sends it to the input mode selecting section 214.

Next, the input mode selecting section 214 determines whether or not the resolution indicated by the resolution information thus received exceeds a first predetermined resolution (hereinafter referred to as "threshold A") (S607). In cases where the resolution exceeds the threshold A (Y in S607), the input mode selecting section 214 selects the first input mode as in Embodiment 1. Subsequent steps in the process are identical to Steps S111 to S121 of Embodiment 1.

On the other hand, in cases where it is determined in Step S607 that the resolution does not exceed the threshold A, the input mode selecting section 214 determines whether or not the resolution indicated by the resolution information thus received falls short of a second predetermined resolution (hereinafter referred to as "threshold B") (S609). It should be noted, however, that the second predetermined resolution is lower than the first predetermined resolution (i.e., threshold A>threshold B).

In cases where the resolution falls short of the threshold B (Y in S609), the input mode selecting section 214 selects the second input mode. Subsequent steps in the process are identical to Steps S123 to S137 of Embodiment 1.

On the other hand, in cases where it is determined in Step S609 that the resolution is not less than the threshold B, the input mode selecting section 214 selects the first input mode. Then, the multifunctional apparatus UI control section 215 generates operation window data indicative of an operation window containing a setting window and an entry-sheet print button. It should be noted here that the entry-sheet print button is a button that a user presses in order to switch to the second input mode. Then, the multifunctional apparatus UI control section 215 generates a control command for instructing the multifunctional apparatus 1a or 1b to display the operation window data, and the communication control section 218 transmits, to the multifunctional apparatus 1a or 1b, the operation window data and the control command thus generated (S611).

Upon receiving the control command and the operation window data from the control server 2, the multifunctional apparatus 1a or 1b displays the operation window, i.e., the setting window and the entry-sheet print button, on its own touch panel 161a or 161b in accordance with the control command (S613). This causes the multifunctional apparatus 1a or 1b to start accepting a setting from the user and a switch to the second input mode.

The user, who has viewed the operation window displayed on the touch panel of the multifunctional apparatus 1a or 1b, operates the operation panel 16a or 16b. In other words, the multifunctional apparatus 1a or 1b accepts an operation from the user via the operation panel 16a or 16b (S617). The operation that is accepted from the user is either (i) input or selection of setting information, or (ii) pressing of the entry-sheet print button. Then, the multifunctional apparatus 1a or 1b transmits, to the control server 2, the operation information thus accepted (S619).

The communication control section 218 of the control server 2 receives the operation information and sends it to the multifunctional apparatus UI control section 215. The multifunctional apparatus UI control section 215 determines whether or not the operation information thus received indicates pressing of the entry-sheet print button (S623). In cases where the operation information thus received indicates pressing of the entry-sheet print button (Y in S623), the input mode selecting section 214 selects the second input mode, so that steps identical to Steps S123 to S137 of Embodiment 1 are taken.

On the other hand, in cases where it is determined in Step S623 that the optional information thus received does not indicate pressing of the entry-sheet print button but indicates input or selection of setting information, the multifunctional apparatus 1a or 1b stays in the first input mode, is instructed to execute a job based on the setting information indicated by the operation information, and executes the job based on the setting information.

As described above, in the control system of the present embodiment, the first input mode is selected in cases where the resolution of the touch panel 161a or 161b of the multifunctional apparatus 1a or 1b is higher than the threshold A, and the second input mode is selected in cases where the resolution is lower than the threshold B. This brings about substantially the same effects as Embodiment 1. Moreover, the resolution of the touch panel 161a or 161b is not less than the threshold B and not more than the threshold A, the first input mode is selected and the second input mode starts to be accepted from the user. Therefore, in cases where it is impossible to definitely judge which input mode to select, it is possible to leave it up to the user to judge which input mode to use.

The first input mode may be selected in cases where the resolution of the touch panel 161*a* or 161*b* of the multifunctional apparatus 1*a* or 1*b* is not less than the threshold A, and the second input mode is selected in cases where the resolution is not more than the threshold B. In cases where the number is larger than the threshold B and smaller than the threshold A, the input mode selecting section 214 only needs to select the first input mode for the meantime and instruct the multifunctional apparatus 1*a* or 1*b* to start accepting the second input mode from a user.

Although the present embodiment has described a modified example of Embodiment 1, Embodiments 2 and 3 can be modified in the same manner. For example, see a modified example of Embodiment 2. In this case, the input mode selecting section 214 selects the second input mode in cases where it is determined in the aforementioned step S207 that the printing performance information indicates that the printing section 15 is capable of color printing and that the display performance information indicates that the touch panel 161*a* or 161*b* is incapable of color display, and selects the first input mode in cases where it is determined in the aforementioned step S207 that the printing performance information indicates that the printing section 15 is incapable of color printing and that the display performance information indicates that the touch panel 161*a* or 161*b* is capable of color display. In other cases, as in the aforementioned modified example of Embodiment 1, the input mode selecting section 214 only needs to select the first input mode for the meantime and instruct the multifunctional apparatus 1*a* or 1*b* to start accepting the second input mode from a user.

Similarly, for example, see a modified example of Embodiment 3. In this case, the input mode selecting section 214 selects the second input mode in cases where it is determined in the aforementioned step S309 that the number of pieces of setting information to be acquired or the number of options to be presented is larger than a threshold C, and selects the first input mode in cases where it is determined in the aforementioned step S309 that the number is smaller than a threshold D (note C>D). In cases where the number is not less than the threshold D and not more than the threshold C, the input mode selecting section 214 only needs to select the first input mode for the meantime and instruct the multifunctional apparatus 1*a* or 1*b* to start accepting the second input mode from a user. Alternatively, the input mode selecting section 214 selects the second input mode in cases where the number of pieces of setting information to be acquired or the number of options to be presented is not less than a threshold C, and selects the first input mode in cases where the number is not more than a threshold D (note C>D). In cases where the number is larger than the threshold D and smaller than the threshold C, the input mode selecting section 214 only needs to select the first input mode for the meantime and instruct the multifunctional apparatus 1*a* or 1*b* to start accepting the second input mode from a user.

[Supplements]

As described above, the control server 2 of each of the aforementioned embodiments is arranged such that: in cases where the multifunctional apparatus 1*a* or 1*b* acquires setting information from a user, the input mode selecting section 214 select either of the two input modes and the command generating section 211 instructs the multifunctional apparatus 1*a* or 1*b* to acquire setting information in the input mode selected by the input mode selecting section 214. This makes it possible to provide the user with an optimum operating environment according to the situation.

It should be noted that the apparatus to be controlled by the control server 2 is not limited to the aforementioned multifunctional apparatus, but may be a copier or a facsimile apparatus. That is, the apparatus to be controlled by the control server 2 only needs to include at least a printing section for performing printing on a sheet such as a recording sheet, a document reading section for reading a sheet, a display section for showing information to a user, and an operation section for accepting a user's operation.

Further, in each of the aforementioned embodiments, the control server 2 is arranged so as to control the multifunctional apparatus 1*a* or 1*b* via a communication network. However, the present invention is not limited to this, and can bring about the same effect even when the control server 2 and the multifunctional apparatus 1*a* or 1*b* are connected via a non-communication network such as a USB.

Furthermore, the control server 2 and the apparatus to be controlled by the control server 2 do not need to be apparatuses independent of each other, but may be integrated with each other. That is, the aforementioned control server 2 may be housed in the multifunctional apparatus 1*a* or 1*b* so as to serve as a control section for controlling each component (FAX transmitting and receiving section 13, scanner section 14, printing section 15, operation panel 16*a* or 16*b*) of the multifunctional apparatus 1*a* or 1*b*.

As described above, a control apparatus according to the present invention is control apparatus for controlling an imaging device, including (a) a printing section for performing printing on a sheet, (b) a document reading section for reading a sheet, (c) a display section for displaying information, and (d) an operation section for accepting a user's operation, and allowing a user to use (i) a first input mode in which setting information serving as information to be acquired from a user is acquired by the display section's displaying a setting window for setting the setting information and by the operation section's accepting, from the user, an operation of designating the setting information and (ii) a second input mode in which the setting information is acquired by the printing section's printing an entry sheet and the document reading section's reading the entry sheet on which the user has written the setting information, the control apparatus including: selecting means for selecting either the first input mode or the second input mode when the imaging apparatus acquires the setting information from the user; and instructing means for instructing the imaging apparatus to acquire the setting information in the input mode selected by the selecting means.

Further, an imaging apparatus control system according to the present invention includes the aforementioned control apparatus and the imaging apparatus.

Further, a control method according to the present invention is a control method for controlling, with use of a control apparatus, an imaging apparatus, including (a) a printing section for performing printing on a sheet, (b) a document reading section for reading a sheet, (c) a display section for displaying information, and (d) an operation section for accepting a user's operation, and allowing a user to use (i) a first input mode in which setting information serving as information to be acquired from a user is acquired by the display section's displaying a setting window for setting the setting information and by the operation section's accepting, from the user, an operation of designating the setting information and (ii) a second input mode in which the setting information is acquired by the printing section's printing an entry sheet and the document reading section's reading the entry sheet on which the user has written the setting information, the control method including: a selecting step of selecting either the first input mode or the second input mode when the imaging apparatus acquires the setting information from the user; and an instructing step of instructing the imaging apparatus to acquire the setting information in the input mode selected by the selecting means.

The control apparatus according to the present invention controls the imaging apparatus and allowing a user to use (i) the first input mode in which the setting information is acquired from the user by displaying the setting window and accepting the operation and (ii) the second input mode in which the setting information is acquired from the user by preparing and scanning the entry sheet.

According to the foregoing arrangement, the control apparatus includes the selecting means for selecting either the first input mode or the second input mode in which the setting information is acquired from the user, and the instructing means instructs the imaging apparatus to acquire the setting information in the input mode selected by the selecting means. This means that the imaging apparatus acquires the setting information from the user by using a suitable one of the first input mode and the second input mode according to the situation. Therefore, a user-friendly input environment is provided.

It should be noted that the imaging apparatus only needs to include a printing section for performing printing on a sheet, a document reading section for reading a sheet, a display section for showing information to a user, and an operation section for accepting a user's operation. Examples of the imaging apparatus include a copier, a facsimile apparatus, and a multifunctional apparatus. Further, the control apparatus may control the imaging apparatus via a communication network, or may control the imaging apparatus via a noncommunication network such as a USB (Universal Serial Bus). Alternatively, the control apparatus may be housed in the imaging apparatus so as to serve as a control section for controlling the printing section, the document reading section, the display section, and the operation section of the imaging apparatus. Further, the setting window and the entry sheet may present a list of selectable setting information options to the user and prompt the user to select a setting information option, or may prompt the user to input or write the setting information.

Further, the selecting means may receive display performance information indicative of resolution or size of the display section of the imaging apparatus from the imaging apparatus, and may choose an input mode in accordance with the display performance information thus received.

More specifically, the selecting means may select the first input mode in cases where the resolution of the display section as indicated by the display performance information thus received is lower than a predetermined resolution or in cases where the size of the display section as indicated by the display performance information thus received is smaller than a predetermined size, and may select the second input mode in cases where the resolution of the display section as indicated by the display performance information thus received is higher than the predetermined resolution or in cases where the size of the display section as indicated by the display performance information thus received is larger than the predetermined size.

In cases where the resolution or size of the display section is insufficient, the display section can only display a small amount of information at a time. This tends to make the user's process cumbersome and complicated by making it necessary to switch from one window to another or scroll through a window. However, according to the foregoing arrangement, the second input mode is selected in cases where the resolution of the display section is low or the size of the display section is small. This allows the user to comfortably input the setting information to the imaging apparatus by using the entry sheet.

Incidentally, in cases where the second input mode is always used, it may take a longer time to print and scan the entry sheet than to input the setting information via the display section and the operation section. However, according to the foregoing arrangement, the first input mode is selected in cases where the resolution or size of the display section is sufficient. This makes it unnecessary for the user to take more time than necessary to print and scan the entry sheet, and allows the user to comfortably input the setting information via the display section and the operation section.

As described above, the foregoing arrangement provides an appropriate input environment according to the resolution or size of the display section of the imaging apparatus.

It should be noted that a comparison of resolution may be made by using the total number of pixels as calculated by multiplying the number of vertical pixels by the number of horizontal pixels, or may be made by using only the number of vertical or horizontal pixels of the display section. Similarly, a comparison of size may be made by using the amount of space as calculated by multiplying the height of the display section by the width of the display section, or may be made by using only the diagonal line, height, or width of the display section.

Furthermore, it is preferable that: the selecting means select the second input mode when the resolution or size indicated by the display performance information is less than a first threshold, and select the first input mode when the resolution or size indicated by the display performance information is greater than the first threshold; and when the resolution or size indicated by the display performance information is greater than the first threshold and less than a second threshold that is greater than the first threshold, the instructing means further instruct the operation section to start accepting, from the user, an instruction to execute the second input mode.

According to the foregoing arrangement, in cases where the resolution or size of the display section is greater than the first threshold and smaller than the second threshold, i.e., in cases where it is not clear which input mode to use, the first input mode is selected for the meantime and the second input mode starts to be accepted. Thus, the user's wish is granted in cases where it is difficult to make a judgment. This makes it possible to realize a more user-friendly input environment.

Further, the selecting means may receive, from the imaging apparatus, printing performance information indicative of whether or not the printing section is capable of color printing and display performance information indicative of whether or not the display section is capable of color display, and may select the first input mode when the printing performance information thus received indicates that the printing section is incapable of color printing and the display performance information thus received indicates that the display section is capable of color display, or may select the second input mode when the printing performance information thus received indicates that the printing section is capable of color printing and the display performance information thus received indicates that the display section is incapable of color display.

In cases where it is necessary to present a color image to a user in acquiring setting information from the user (e.g., in performing selection of a color photographic image or color setting), use of a display section capable of only monochrome display or a printing section capable of only monochrome printing makes it impossible to accurately convey necessary information to the user. However, according to the foregoing arrangement, an input mode in which a color image can be presented is selected. This makes it possible to accurately convey necessary information to the user.

As described above, the foregoing arrangement provides an appropriate input environment according to the performance of the display and printing sections of the imaging apparatus.

Furthermore, it is preferable that: the selecting means select the first input mode when the printing performance information indicates that the printing section is capable of color printing and the display performance information indicates that the display section is capable of color display and when the printing performance information indicates that the printing section is incapable of color printing and the display performance information indicates that the display section is incapable of color display; and when the printing performance information indicates that the printing section is capable of color printing and the display performance information indicates that the display section is capable of color display and when the printing performance information indicates that the printing section is incapable of color printing and the display performance information indicates that the display section is incapable of color display, the instructing means further instruct the operation section to start accepting, from the user, an instruction to execute the second input mode.

According to the foregoing arrangement, the user's wish is granted in cases where it is difficult to judge which input mode to select, e.g., in cases where neither the display section nor the printing section can deal with colors or in cases where they can both deal with colors. This makes it possible to realize a more user-friendly input environment.

Further, the selecting means may choose an input mode in accordance with the number of pieces of setting information that the imaging apparatus is supposed to acquire from the user.

More specifically, the selecting means may select the first input mode in cases where the number of pieces of setting information that the imaging apparatus is supposed to acquire from the user is smaller than a threshold, and may select the second input mode in cases where the number is larger than the threshold.

In cases where the number of setting items is so large that the user must input a large number of pieces of setting information, the necessity of switching from one window to another or scrolling through a window tends to arise to make the user's process cumbersome and complicated. However, according to the foregoing arrangement, the second input mode is selected in cases where the number of pieces of setting information is large. This allows the user to comfortably input the setting information to the imaging apparatus by using the entry sheet.

Incidentally, in cases where the second input mode is always used, it may take a longer time to print and scan the entry sheet than to input the setting information via the display section and the operation section. However, according to the foregoing arrangement, the first input mode is selected in cases where the number of pieces of setting information is small. This makes it unnecessary for the user to take more time than necessary to print and scan the entry sheet, and allows the user to comfortably input the setting information via the display section and the operation section.

As described above, the foregoing arrangement provides an appropriate input environment according to the number of pieces of setting information to be inputted by the user.

Furthermore, it is preferable that: the selecting means select the second input mode when the number is larger than a third threshold, and select the first input mode when the number is smaller than the third threshold; and when the number is smaller than the third threshold and larger than a fourth threshold that is less than the third threshold, the instructing means further instruct the operation section to start accepting, from the user, an instruction to execute the second input mode.

According to the foregoing arrangement, in cases where the number of pieces of setting information to be acquired from the user is larger than the fourth threshold and smaller than the third threshold, i.e., in cases where it is not clear which input mode to use, the first input mode is selected for the meantime and the second input mode starts to be accepted. Thus, the user's wish is granted in cases where it is difficult to make a judgment. This makes it possible to realize a more user-friendly input environment.

Further, the selecting means may choose an input mode in accordance with number of setting information options that the imaging apparatus presents to the user in order to acquire the setting information.

More specifically, the selecting means may select the first input mode in cases where the number of setting information options to be presented to the user is smaller than a threshold, and may select the second input mode in cases where the number is larger than the threshold.

In cases where the number of setting information options is large, the necessity of switching from one window to another or scrolling through a window tends to arise to make the user's process cumbersome and complicated. However, according to the foregoing arrangement, the second input mode is selected in cases where the number of setting information options is large. This allows the user to comfortably input the setting information to the imaging apparatus by using the entry sheet.

Incidentally, in cases where the second input mode is always used, it may take a longer time to print and scan the entry sheet than to input the setting information via the display section and the operation section. However, according to the foregoing arrangement, the first input mode is selected in cases where the number of setting information options is small. This makes it unnecessary for the user to take more time than necessary to print and scan the entry sheet, and allows the user to comfortably input the setting information via the display section and the operation section.

As described above, the foregoing arrangement provides an appropriate input environment according to the number of setting information options to be presented to the user.

Furthermore, it is preferable that: the selecting means select the second input mode when the number is larger than a fifth threshold, and select the first input mode when the number is smaller than the fifth threshold; and when the number is smaller than the fifth threshold and larger than a sixth threshold that is less than the fifth threshold, the instructing means further instruct the operation section to start accepting, from the user, an instruction to execute the second input mode.

According to the foregoing arrangement, in cases where the number of setting information options to be presented to the user is larger than the sixth threshold and smaller than the fifth threshold, i.e., in cases where it is not clear which input mode to use, the first input mode is selected for the meantime and the second input mode starts to be accepted. Thus, the user's wish is granted in cases where it is difficult to make a judgment. This makes it possible to realize a more user-friendly input environment.

Further, the selecting means may choose an input mode in accordance with whether it is necessary to present a thumbnail image to the user in acquiring the setting information.

More specifically, the selecting means may select the first input mode in cases where it is not necessary to present a thumbnail image to the user, and may select the second input mode in cases where it is necessary to present a thumbnail image to the user.

According to the foregoing arrangement, the second input mode is selected in cases where it is necessary to present a thumbnail image, so that a large number of thumbnail images are printed on a sheet with high resolution. This allows the user to quickly view and select the images.

Incidentally, in cases where the second input mode is always used as in Patent Document 2 (Japanese Unexamined Patent Application Publication No. 231380/1991 (Tokukaihei 3-231380; published on Oct. 15, 1991)), it may take a longer time to print and scan the entry sheet than to input the setting information via the display section and the operation section. However, according to the foregoing arrangement, the first input mode is selected in cases where it is not necessary to present a thumbnail image. This makes it unnecessary for the user to take more time than necessary to print and scan the entry sheet, and allows the user to comfortably input the setting information via the display section and the operation section.

As described above, the foregoing arrangement provides an appropriate input environment in accordance with whether it is necessary to present a thumbnail image.

Further, the selecting means may choose an input mode in accordance with whether it is necessary to acquire character information from the user in acquiring the setting information.

More specifically, the selecting means may select the first input mode in cases where it is not necessary to acquire character information from the user, and may select the second input mode in cases where it is necessary to acquire character information from the user.

It is troublesome and complicated for the user to input various types of character information such as numbers, alphabets, katakana, hiragana, and kanji with use of the operation section to which he/she is unaccustomed. However, according to the foregoing arrangement, the second input mode is selected in cases where it is necessary to acquire character information from the user. Therefore, the user does not need to use the operation section to which he/she is unaccustomed, and can input character information to the imaging apparatus by writing a character on the entry sheet. This allows the user to quickly and comfortably input character information.

Incidentally, in cases where the second input mode is always used, it may take a longer time to print and scan the entry sheet than to input the setting information via the display section and the operation section. However, according to the foregoing arrangement, the first input mode is selected in cases where it is not necessary to acquire character information. This makes it unnecessary for the user to take more time than necessary to print and scan the entry sheet, and allows the user to comfortably input the setting information via the display section and the operation section.

As described above, the foregoing arrangement provides an appropriate input environment in accordance with whether it is necessary to acquire character information.

Further, it is preferable that when the selecting means selects the first input mode, the instructing means further instruct the operation section to start accepting, from the user, an instruction to execute the second input mode.

According to the foregoing arrangement, in cases where the selecting means selects the first input mode although the user wishes to select the second input mode, the user can change to the second input mode.

Further, the setting information may be information indicative of a job execution condition under which a job that the imaging apparatus accepts via the operation section is executed.

More specifically, the job may be a copy job in which the document reading section of the imaging apparatus acquires image information by reading a sheet and in which the printing section prints the image information thus acquired, and the setting information may be information that designates a copying condition.

Alternatively, the job may be a document reading job in which the document reading section of the imaging apparatus acquires image information by reading a sheet, and the setting information may be information that designates a document reading condition.

Alternatively, the job may be a document reading and transmitting job in which the document reading section of the imaging apparatus acquires image information by reading a sheet and in which the image information thus acquired is transmitted by e-mail, and the setting information may be information that designates an e-mail address as a destination to which the image information is transmitted.

Alternatively, the job may be a document reading job in which the document reading section of the imaging apparatus acquires image information by reading a sheet and in which the image information thus acquired is saved, and the setting information may be information that designates where the image information is saved.

Alternatively, the job may be a translation copy job in which the document reading section of the imaging apparatus acquires character string information, in which translation information is prepared by translating the character string information thus acquired, and in which the printing section of the imaging apparatus prints the translation information thus prepared, and the setting information may be setting information necessary in translating the character string information. In this case, the process of preparing the translation information may be performed by the imaging apparatus, the control apparatus, or an external server other than them. Further, the setting information necessary in translating the character string information may, for example, be information that designates a dictionary file or information that designates a translation server.

Further, the setting information may be system setting information for setting a system for the imaging apparatus. Unlike a job execution condition, the system setting information is not information that must be set for each job execution instruction, but is information that basically does not need to be changed once it is set.

Incidentally, the control apparatus may be realized by hardware, or may be realized by causing a computer to execute a program. Specifically, a program according to the present invention is a program for operating a computer as each means of the control apparatus, and a storage medium according to the present invention contains the program.

When the program is executed by a computer, the computer operates as the control apparatus, thereby making it possible to provide a more user-friendly input environment, as with the control apparatus.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. A control apparatus for controlling an imaging device, including (a) a printing section for performing printing on a sheet, (b) a document reading section for reading a sheet, (c) a display section for displaying information, and (d) an operation section for accepting a user's operation, and allowing a user to use (i) a first input mode in which setting information serving as information to be acquired from a user is acquired by the display section displaying a setting window for setting the setting information and by the operation section accepting, from the user, an operation of designating the setting information and (ii) a second input mode in which the setting information is acquired by the printing section printing an entry sheet and the document reading section reading the entry sheet on which the user has written the setting information, the control apparatus comprising:
a selecting means for selecting either the first input mode or the second input mode when the imaging device acquires the setting information from the user; and
an instructing means for instructing the imaging device to acquire the setting information in the first or second input mode selected by the selecting means,
wherein the selecting means receives display performance information indicative of resolution or size of the display section of the imaging device from the imaging device, and chooses an input mode in accordance with the display performance information thus received.

2. The control apparatus as set forth in claim 1, wherein:
the selecting means selects the second input mode when the resolution or size indicated by the display performance information is less than a first threshold, and selects the first input mode when the resolution or size indicated by the display performance information is greater than the first threshold; and
when the resolution or size indicated by the display performance information is greater than the first threshold and less than a second threshold that is greater than the first threshold, the instructing means further instructs the operation section to start accepting, from the user, an instruction to execute the second input mode.

3. The control apparatus as set forth in claim 1, wherein when the selecting means selects the first input mode, the instructing means further instructs the operation section to start accepting, from the user, an instruction to execute the second input mode.

4. The control apparatus as set forth in claim 1, wherein the setting information is information indicative of a job execution condition under which a job that the imaging device accepts via the operation section is executed.

5. The control apparatus as set forth in claim 4, wherein:
the job is a copy job in which the document reading section of the imaging device acquires image information by reading a sheet and in which the printing section prints the image information thus acquired; and
the setting information is information that designates a copying condition.

6. The control apparatus as set forth in claim 4, wherein:
the job is a document reading job in which the document reading section of the imaging device acquires image information by reading a sheet; and
the setting information is information that designates a document reading condition.

7. The control apparatus as set forth in claim 4, wherein:
the job is a document reading job in which the document reading section of the imaging device acquires image information by reading a sheet and in which the image information thus acquired is saved; and
the setting information is information that designates where the image information is saved.

8. The control apparatus as set forth in claim 1, wherein the setting information is system setting information for setting a system for the imaging device.

9. A control apparatus for controlling an imaging device, including (a) a printing section for performing printing on a sheet, (b) a document reading section for reading a sheet, (c) a display section for displaying information, and (d) an operation section for accepting a user's operation, and allowing a user to use (i) a first input mode in which setting information serving as information to be acquired from a user is acquired by the display section displaying a setting window for setting the setting information and by the operation section accepting, from the user, an operation of designating the setting information and (ii) a second input mode in which the setting information is acquired by the printing section printing an entry sheet and the document reading section reading the entry sheet on which the user has written the setting information, the control apparatus comprising:
a selecting means for selecting either the first input mode or the second input mode when the imaging device acquires the setting information from the user; and
an instructing means for instructing the imaging device to acquire the setting information in the first or second input mode selected by the selecting means,
wherein the selecting means receives, from the imaging device, printing performance information indicative of whether or not the printing section is capable of color printing and display performance information indicative of whether or not the display section is capable of color display, and selects the first input mode when the printing performance information thus received indicates that the printing section is incapable of color printing and the display performance information thus received indicates that the display section is capable of color display, or selects the second input mode when the printing performance information thus received indicates that the printing section is capable of color printing and the display performance information thus received indicates that the display section is incapable of color display.

10. The control apparatus as set forth in claim 9, wherein:
the selecting means selects the first input mode when the printing performance information indicates that the printing section is capable of color printing and the display performance information indicates that the display section is capable of color display and when the printing performance information indicates that the printing section is incapable of color printing and the display performance information indicates that the display section is incapable of color display; and
when the printing performance information indicates that the printing section is capable of color printing and the display performance information indicates that the display section is capable of color display and when the printing performance information indicates that the printing section is incapable of color printing and the display performance information indicates that the display section is incapable of color display, the instructing means further instructs the operation section to start accepting, from the user, an instruction to execute the second input mode.

11. A control apparatus for controlling an imaging device, including (a) a printing section for performing printing on a sheet, (b) a document reading section for reading a sheet, (c) a display section for displaying information, and (d) an operation section for accepting a user's operation, and allowing a user to use (i) a first input mode in which setting information serving as information to be acquired from a user is acquired by the display section displaying a setting window for setting the setting information and by the operation section accepting, from the user, an operation of designating the setting information and (ii) a second input mode in which the setting information is acquired by the printing section printing an entry sheet and the document reading section reading the entry sheet on which the user has written the setting information, the control apparatus comprising;
 a selecting means for selecting either the first input mode or the second input mode when the imaging device acquires the setting information from the user; and
 an instructing means for instructing the imaging device to acquire the setting information in the first or second input mode selected by the selecting means,
 wherein the selecting means chooses an input mode in accordance with a number of pieces of setting information that the imaging device is supposed to acquire from the user.

12. The control apparatus as set forth in claim 11, wherein:
 the selecting means selects the second input mode when the number is larger than a third threshold, and selects the first input mode when the number is smaller than the third threshold; and
 when the number is smaller than the third threshold and larger than a fourth threshold that is less than the third threshold, the instructing means further instructs the operation section to start accepting, from the user, an instruction to execute the second input mode.

13. A control apparatus for controlling an imaging device, including (a) a printing section for performing printing on a sheet, (b) a document reading section for reading a sheet, (c) a display section for displaying information, and (d) an operation section for accepting a user's operation, and allowing a user to use (i) a first input mode in which setting information serving as information to be acquired from a user is acquired by the display section displaying a setting window for setting the setting information and by the operation section accepting, from the user, an operation of designating the setting information and (ii) a second input mode in which the setting information is acquired by the printing section printing an entry sheet and the document reading section reading the entry sheet on which the user has written the setting information, the control apparatus comprising:
 a selecting means for selecting either the first input mode or the second input mode when the imaging device acquires the setting information from the user; and
 an instructing means for instructing the imaging device to acquire the setting information in the first or second input mode selected by the selecting means,
 wherein the selecting means chooses an input mode in accordance with a number of setting information options that the imaging device presents to the user in order to acquire the setting information.

14. The control apparatus as set forth in claim 13, wherein:
 the selecting means selects the second input mode when the number is larger than a fifth threshold, while selecting the first input mode when the number is smaller than the fifth threshold; and
 when the number is smaller than the fifth threshold and larger than a sixth threshold that is less than the fifth threshold, the instructing means further instructs the operation section to start accepting, from the user, an instruction to execute the second input mode.

15. A control apparatus for controlling an imaging device, including (a) a printing section for performing printing on a sheet, (b) a document reading section for reading a sheet, (c) a display section for displaying information, and (d) an operation section for accepting a user's operation, and allowing a user to use (i) a first input mode in which setting information serving as information to be acquired from a user is acquired by the display section displaying a setting window for setting the setting information and by the operation section accepting, from the user, an operation of designating the setting information and (ii) a second input mode in which the setting information is acquired by the printing section printing an entry sheet and the document reading section reading the entry sheet on which the user has written the setting information, the control apparatus comprising:
 a selecting means for selecting either the first input mode or the second input mode when the imaging device acquires the setting information from the user; and
 an instructing means for instructing the imaging device to acquire the setting information in the first or second input mode selected by the selecting means,
 wherein the selecting means chooses an input mode in accordance with whether it is necessary to present a thumbnail image to the user in acquiring the setting information.

16. A control apparatus for controlling an imaging device, including (a) a printing section for performing printing on a sheet, (b) a document reading section for reading a sheet, (c) a display section for displaying information, and (d) an operation section for accepting a user's operation, and allowing a user to use (i) a first input mode in which setting information serving as information to be acquired from a user is acquired by the display section displaying a setting window for setting the setting information and by the operation section accepting, from the user, an operation of designating the setting information and (ii) a second input mode in which the setting information is acquired by the printing section printing an entry sheet and the document reading section reading the entry sheet on which the user has written the setting information, the control apparatus comprising:
 a selecting means for selecting either the first input mode or the second input mode when the imaging device acquires the setting information from the user; and
 an instructing means for instructing the imaging device to acquire the setting information in the first or second input mode selected by the selecting means,
 wherein the selecting means chooses an input mode in accordance with whether it is necessary to acquire character information from the user in acquiring the setting information.

17. A control apparatus for controlling an imaging device, including (a) a printing section for performing printing on a sheet, (b) a document reading section for reading a sheet, (c) a display section for displaying information, and (d) an operation section for accepting a user's operation, and allowing a user to use (i) a first input mode in which setting information serving as information to be acquired from a user is acquired by the display section displaying a setting window for setting the setting information and by the operation section accepting, from the user, an operation of designating the setting information and (ii) a second input mode in which the setting information is acquired by the printing section printing an entry sheet and the document reading section reading the entry sheet on which the user has written the setting information, the control apparatus comprising:

selecting means for selecting either the first input mode or the second input mode when the imaging device acquires the setting information from the user; and instructing means for instructing the imaging device to acquire the setting information in the first or second input mode selected by the selecting means;

wherein the setting information is information indicative of a job execution condition under which a job that the imaging device accepts via the operation section is executed; and wherein:

the job is a document reading and transmitting job in which the document reading section of the imaging device acquires image information by reading a sheet and in which the image information thus acquired is transmitted by e-mail; and the setting information is information that designates an e-mail address as a destination to which the image information is transmitted.

18. A control apparatus for controlling an imaging device, including (a) a printing section for performing printing on a sheet, (b) a document reading section for reading a sheet, (c) a display section for displaying information, and (d) an operation section for accepting a user's operation, and allowing a user to use (i) a first input mode in which setting information serving as information to be acquired from a user is acquired by the display section displaying a setting window for setting the setting information and by the operation section accepting, from the user, an operation of designating the setting information and (ii) a second input mode in which the setting information is acquired by the printing section printing an entry sheet and the document reading section reading the entry sheet on which the user has written the setting information, the control apparatus comprising:

selecting means for selecting either the first input mode or the second input mode when the imaging device acquires the setting information from the user; and instructing means for instructing the imaging device to acquire the setting information in the first or second input mode selected by the selecting means;

wherein the setting information is information indicative of a job execution condition under which a job that the imaging device accepts via the operation section is executed; and wherein:

the job is a translation copy job in which the document reading section of the imaging device acquires character string information, in which translation information is prepared by translating the character string information thus acquired, and in which the printing section of the imaging device prints the translation information thus prepared; and the setting information is setting information necessary in translating the character string information.

\* \* \* \* \*